US008229440B2

(12) United States Patent
Yoon et al.

(10) Patent No.: US 8,229,440 B2
(45) Date of Patent: Jul. 24, 2012

(54) SYSTEMS, METHODS AND APPARATUS TO FACILITATE IDENTIFICATION AND ACQUISITION OF ACCESS POINTS

(75) Inventors: Young C. Yoon, San Diego, CA (US); Manoj M. Deshpande, San Diego, CA (US); Jen Mei Chen, San Diego, CA (US); Chandrasekhar T. Sundarraman, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 12/501,807

(22) Filed: Jul. 13, 2009

(65) Prior Publication Data

US 2010/0008259 A1 Jan. 14, 2010

Related U.S. Application Data

(60) Provisional application No. 61/080,618, filed on Jul. 14, 2008.

(51) Int. Cl.
*H04W 4/00* (2009.01)
*H04W 36/00* (2009.01)

(52) U.S. Cl. ............... 455/444; 455/435.1; 370/328

(58) Field of Classification Search .......... None
See application file for complete search history.

(56) References Cited

U.S. PATENT DOCUMENTS

| 7,003,297 B2 | 2/2006 | Willars et al. |
| 2006/0035636 A1* | 2/2006 | Pirila ............ 455/435.2 |
| 2006/0063530 A1 | 3/2006 | Niu |
| 2006/0172735 A1 | 8/2006 | Buckley et al. |
| 2007/0097904 A1 | 5/2007 | Mukherjee et al. |
| 2008/0039086 A1 | 2/2008 | Gallagher et al. |
| 2009/0129291 A1* | 5/2009 | Gupta et al. ............ 370/254 |

FOREIGN PATENT DOCUMENTS

| EP | 1758303 | 2/2007 |
| WO | WO2006138570 A1 | 12/2006 |
| WO | WO2008021547 A2 | 2/2008 |
| WO | WO2008025003 | 2/2008 |

OTHER PUBLICATIONS

International Search Report and Written Opinion—PCT/US2009/050578, International Search Authority—European Patent Office—Jun. 23, 2003.

* cited by examiner

*Primary Examiner* — Erika Gary
(74) *Attorney, Agent, or Firm* — Florin C. Corie

(57) ABSTRACT

Systems, apparatus and methods for facilitating identification and/or acquisition of an access point are provided. Methods can include transmitting or receiving access point information ("API") indicative of an identification of the access point ("AP"). The API can be provided at the AP through hardwiring or receipt of configuration information input by a user or transmitted to the AP by a network operator through Over-The-Air ("OTA") signaling. The API can be computer-readable and, in some embodiments, the API can also be human-readable. The API can be transmitted on a paging channel from which user equipment ("UE") can receive information. The frequency at which the API is transmitted can be fixed, dynamic and/or configurable. Upon receipt of the API, acquisition of the AP is attempted if the AP is determined to be a permitted AP.

29 Claims, 19 Drawing Sheets

SYSTEMS, METHODS AND APPARATUS TO FACILITATE IDENTIFICATION AND ACQUISITION OF ACCESS POINTS

CLAIM OF PRIORITY UNDER 35 U.S.C. §119

The present application for patent claims priority to Provisional Application No. 61/080,618, entitled "Method and Apparatus to Provide a Femto Cell Identifier/Signalling Message for 1xRTT and Wireless Systems," filed Jul. 14, 2008, assigned to the assignee hereof and hereby expressly incorporated by reference herein.

BACKGROUND

1. Field

The present disclosure relates generally to wireless communications, and more specifically, to systems, methods and apparatus for facilitating identification and/or acquisition of access points in wireless communications systems.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications with mobile communications and have increasingly demanded great voice quality, reliable service, and low prices.

In addition to mobile phone networks currently in place, a new class of small access points has emerged, which can be installed in a user's home and provide indoor wireless coverage to mobile units using existing broadband Internet connections. Such access points are also known as miniature base stations, Home Node Bs (HNBs), or femto cells. Typically, such access points are connected to the Internet and the mobile operator's network via DSL router or cable modem.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for facilitating identification and acquisition of an access point is provided. The method can include: receiving access point information indicative of an identification of the access point; and in response to determining that the access point is a permitted access point, attempting acquisition of the access point.

According to another aspect, a computer program product is provided. The computer program product can include a computer-readable medium. The computer-readable medium can include: code for causing at least one computer to receive access point information indicative of an identification of an access point; and code for causing at least one computer to attempt acquisition of the access point in response to determining that the access point is a permitted access point.

According to another aspect, an apparatus is provided. The apparatus can include: means for receiving access point information indicative of an identification of an access point; means for masking a portion of the access point information; means for comparing an unmasked portion of the access point information with information indicative of identities of one or more access points to which access by the apparatus is authorized; and means for attempting to acquire the access point if the means for comparing generates an output indicative of the apparatus being permitted to access the access point.

According to another aspect, another apparatus is provided. The apparatus can include: a user equipment ("UE") database module configured to store information indicative of identities of one or more access points to which access by the apparatus is authorized; a UE receiver module configured to receive a first signal including access point information indicative of an identification of an access point proximate to a geographical location of the apparatus; a UE filter module coupled to the UE receiver module and configured to mask a portion of the received access point information; a UE processor module coupled to the UE filter module and the UE database module and configured to compare an unmasked portion of the access point information with the information indicative of identities of one or more access points to which access by the apparatus is authorized, and determine whether the access point is a permitted access point based on a result of the comparison; and a UE transmitter module coupled to the UE processor module and configured to transmit a signal to the access point for attempting acquisition of the access point if the UE processor module determines that the access point is a permitted access point.

According to another aspect, a method is provided. The method can include: transmitting, to user equipment, access point information indicative of an identification of the access point; receiving, from the user equipment, information indicative of a registration request, wherein the registration request is transmitted by the user equipment if the user equipment determines that the access point is a permitted access point; and providing access to the user equipment in response to receiving the information indicative of the registration request.

According to another aspect, a computer program product having a computer-readable medium is provided. The computer-readable medium can include: code for causing at least one computer to transmit to user equipment access point information indicative of an identification of the access point; code for causing at least one computer to receive information indicative of a registration request from the user equipment in response to transmitting the access point information if the user equipment determines that that the access point is a permitted access point; and code for causing at least one computer to provide access to the user equipment in response to receiving the information indicative of the registration request.

According to another aspect, an apparatus is provided. The apparatus can include: means for transmitting to user equipment, access point information indicative of an identification of the access point; means for receiving information indicative of a registration request from the user equipment in response to transmitting the access point information; and means for permitting the user equipment to access the apparatus if the user equipment is permitted to access the apparatus.

According to another aspect, an apparatus is provided. The apparatus can include: a database module configured to store information indicative of one or more user equipment authorized to access the apparatus; a memory module configured to store first access point information indicative of the identity of the apparatus; a transmitter module configured to transmit the first access point information; a receiver module configured to receive a first signal including information indicative of a registration request from the user equipment; and a processor module configured to provide access to the user equipment if the user equipment is authorized to access the apparatus.

According to another aspect, a method is provided. The method can include: transmitting, by user equipment, handoff information received from the target access point. The handoff information can include: information indicative of an identity of a mobile switching center to which the target access point is associated; and information indicative of an identity of a cell to which the target access point is associated.

According to another embodiment, a computer program product having a computer-readable medium is provided. The computer-readable medium can include: code for causing a computer to receive transmitted handoff information from a target access point. The handoff information can include: information indicative of an identity of a mobile switching center to which the target access point is associated; and information indicative of an identity of a cell to which the target access point is associated.

According to another aspect, an apparatus is provided. The apparatus can include: a receiver module configured to receive transmitted handoff information from a target access point. The handoff information can include: information indicative of an identity of a mobile switching center to which the target access point is associated; and information indicative of an identity of a cell to which the target access point is associated. The apparatus can also include: a memory module configured to store the handoff information; and a processor module configured to process the handoff information and control a transmitter module to transmit the handoff information to initiate handoff to the target access point.

According to another aspect, an apparatus is provided. The apparatus can include: means for receiving transmitted handoff information from a target access point. The handoff information can include: information indicative of an identity of a mobile switching center to which the target access point is associated; and information indicative of an identity of a cell to which the target access point is associated. The apparatus can also include: means for storing the handoff information; means for transmitting the handoff information; and means for processing the handoff information and controlling the means for transmitting to transmit the handoff information to initiate handoff to the target access point.

According to another aspect, a method is provided. The method includes: facilitating identification and acquisition of a femto cell access point, the method comprising: transmitting, to user equipment, access point information indicative of an identification of the femto cell access point.

According to another aspect, a method is provided. The method can be a method for performing handoff of a mobile station ("MS") from a macro base station controller ("Macro BS") of a macro cell to a target femto access point ("target femto AP"). The method can include: transmitting, by the MS to the macro cell, information indicative of signal strength information, wherein the signal strength information includes a pilot strength measurement; determining, by the Macro BS, whether to perform handoff of the MS to the target femto AP; and, in response to determining that handoff should be performed, signaling to a mobile switching center ("MSC"), a message for requesting handoff. The method can also include: determining, by the MSC, that a target cell is associated with information indicative of an identity of the MSC for a femto convergence server ("FCS"), and transmitting a facilities directive message to the FCS associated with the target cell. The method can also include: reserving, by the FCS, an inter-vendor trunk ("IVT") port for terminating the IVT identified with the facilities directive message, and media gateway ("MGW") resources to terminate a real-time transport protocol ("RTP") bearer path with the target femto AP. The method can also include: transmitting, by the FCS to one or more candidate femto access points ("femto APs"), a session initiation protocol ("SIP") message with a measurement request for the MS if no femto AP can be uniquely determined as the target femto AP. The method can also include: attempting to detect, by the one or more candidate femto APs, the MS and measure the signal strength of an MS uplink while the MS is engaged in an active voice call over a network provided in the macro cell; and transmitting, by the one or more candidate femto APs to the FCS, the measured signal strengths, wherein transmitting to the FCS includes transmitting the measured signal strengths to a call session control function ("CSCF"), and the CSCF transmitting the measured signal strengths to the FCS. The method can also include: determining, by the FCS, as the target femto AP to which handoff should be performed, one of the one or more candidate femto APs, based on the measured signal strengths received at the FCS; and transmitting, by the FCS to the target femto AP, a SIP invite message, the SIP invite message being indicative of a handoff request. The method can also include: transmitting, by the target femto AP, information indicative of acknowledgement of the handoff request; establishing a voice/bearer path for the MS; and transmitting, by the FCS, to the MSC, a Mobile Application Part ("MAP") facilities directive return result message confirming establishment of an IVT connection. The method can also include: transmitting, by the MSC and via the Macro BS, information directing the MS to handoff to the target femto AP; transmitting, from the MS to the target femto AP, a handoff complete message; acquiring a forward link traffic channel from the target femto AP; and establishing a voice path between the MS and the target femto AP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
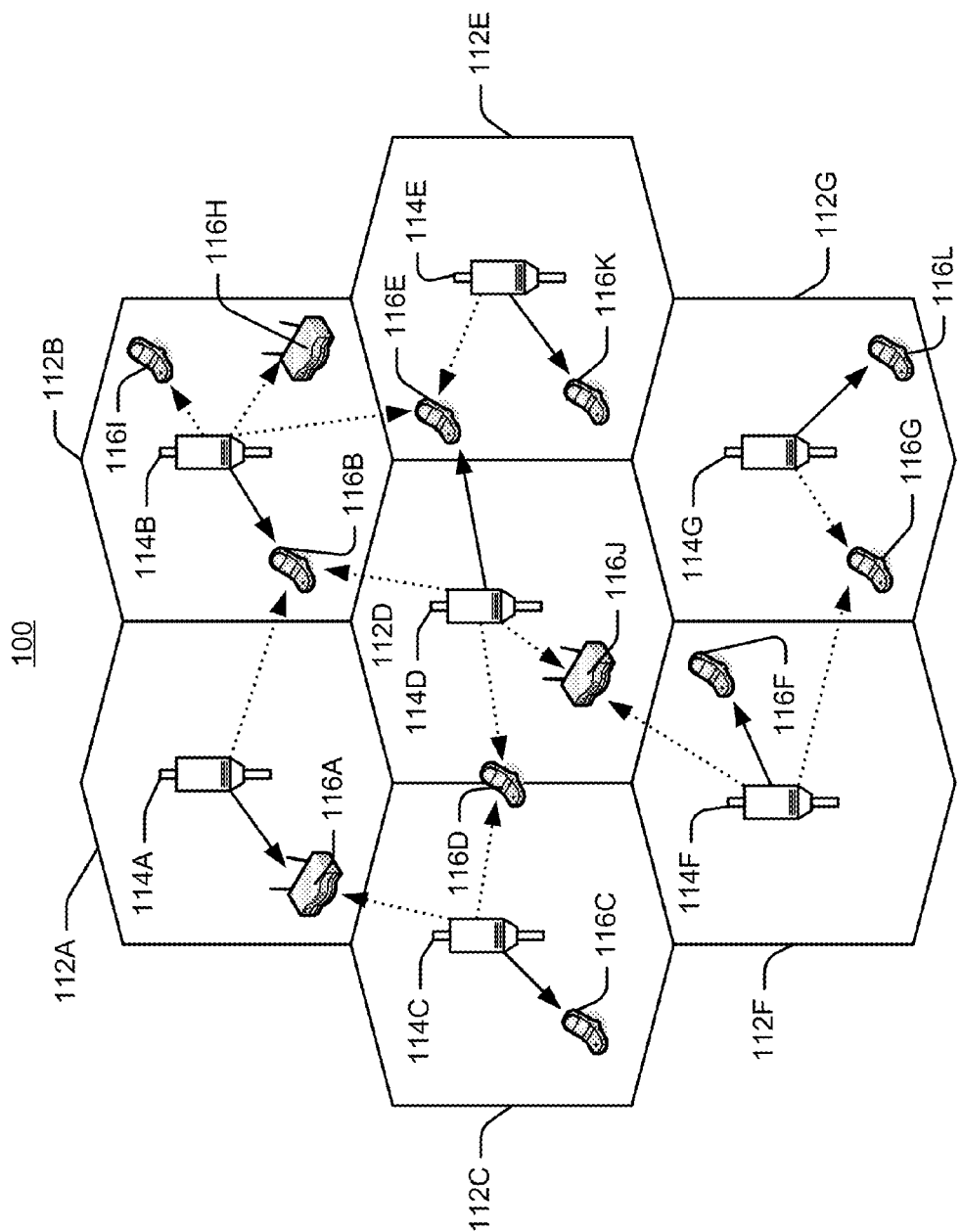
FIG. 1 illustrates an exemplary wireless communication system for identification and/or acquisition of access points according to an embodiment.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this patent application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment ("UE"). A wireless terminal can be a cellular telephone, a satellite phone, a cordless telephone, a Session Initiation Protocol ("SIP") phone, a wireless local loop ("WLL") station, a personal digital assistant ("PDA"), a handheld device having wireless connection capability, a computing device, and/or other processing devices connected to a wireless modem. Moreover, various aspects are described herein in connection with an access point and/or base station. An access point can be utilized for communicating with wireless terminal(s) and can also be referred to as a Node B, an access node, base station and/or some other terminology. Further, it is understood that while the terms "access point," "AP" and/or "femto AP" may be used herein, the embodiments described herein may also be employed in cells of other types or geographical scopes including, but not limited to, personal cells generally limited to the body of a user and/or pico cells. A base station can be used for communicating with a terminal and/or an AP. It is understood that the base station can also be referred to as the macro network.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement radio technologies such as Universal Terrestrial Radio Access (UTRA), cdma2000, cdma2000 1xRTT, etc. UTRA includes Wideband-CDMA (W-CDMA) and other variants of CDMA. Further, cdma2000 covers IS-2000, IS-95 and IS-856 standards. High Data Rate Packet Data ("HRPD") radio technologies, including, but not limited to, cdma2000 1xEV-DO, can also be implemented. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.15 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an exemplary wireless communication system for identification and/or acquisition of access points according to an embodiment. The system 100 provides communication for multiple cells 112, such as, for example, macro cells 112A-112G, with each cell being serviced by a corresponding access node ("AN") 114 (e.g., access nodes 114A-114G). As shown in FIG. 1, UEs 116 (e.g., UEs 116A-116L) may be dispersed at various locations throughout the system over time. Each UE 116 may communicate with one or more access nodes 114 on a forward link ("FL") and/or a reverse link ("RL") at a given moment, depending upon whether the UE 116 is active and whether it is in soft handoff, for example. The wireless communication system 110 may provide service over a large geographic region. For example, macro cells 112A-112G may cover a few blocks in a neighborhood.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As a UE moves through such a network, the UE may be served in certain locations by access nodes that provide macro coverage while the UE may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto AP. A node that provides coverage over an area that is smaller than a macro area and larger than a femto area may be referred to as a pico node (e.g., providing coverage within a commercial building).

A cell associated with a macro node, a femto AP, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto AP, or a pico node. For example, a macro node may be configured or referred to as an access node, base station, access point, node, eNodeB, macro cell, and so on. Also, a femto AP may be configured or referred to as a Home NodeB, Home eNodeB, access point base station, femto cell, and so on.

Figure 2A:
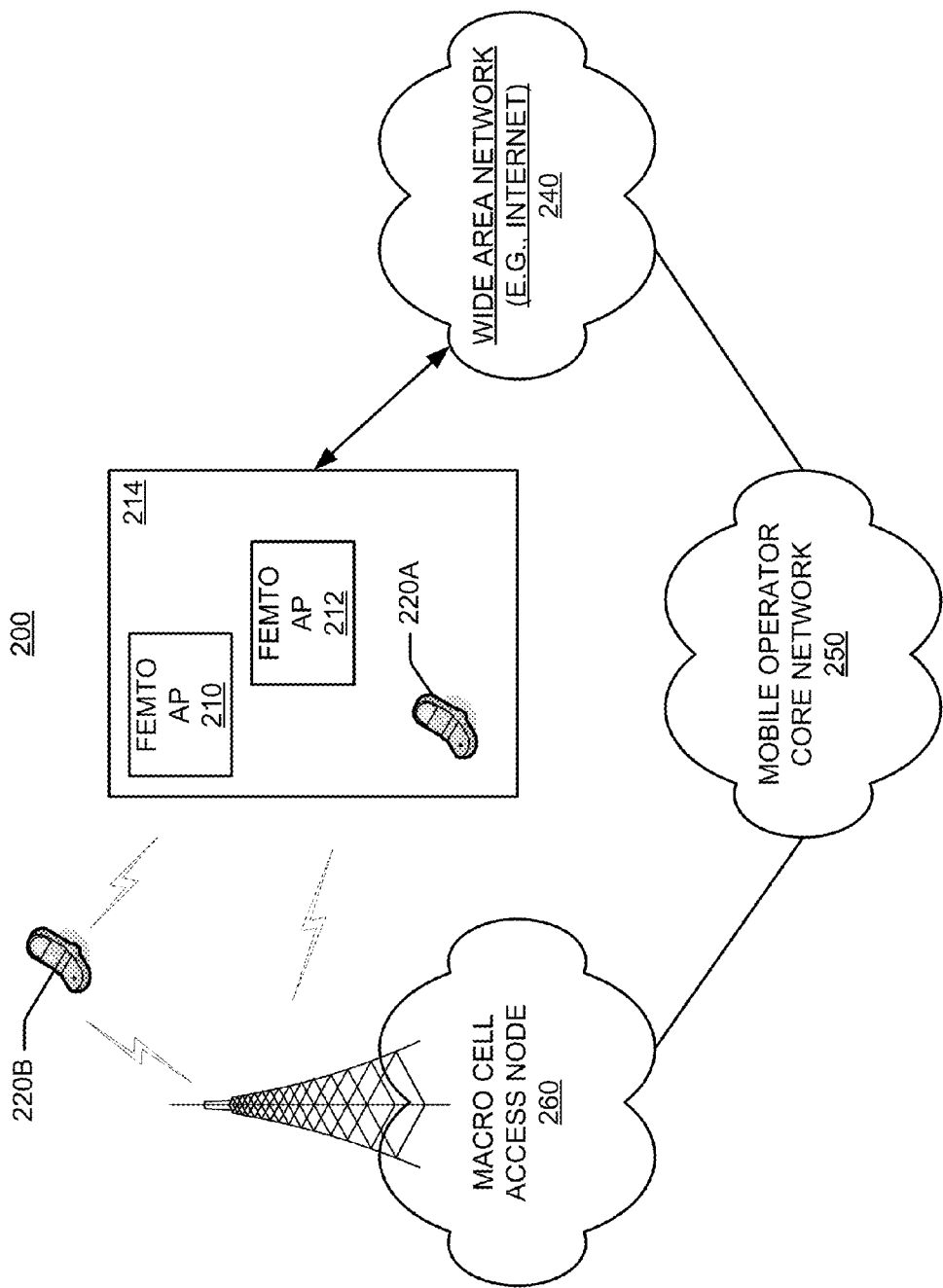
FIG. 2A illustrates an exemplary communication system where one or more femto access points are deployed within a network environment according to an embodiment.

FIG. 2A illustrates an exemplary communication system where one or more femto access points are deployed within a network environment. Specifically, the system 200 includes multiple femto APs 210 (e.g., femto APs 210 and 212) installed in a relatively small scale network environment (e.g., in one or more user residences 214). Each femto AP 210 may be coupled to a wide area network 240 (e.g., the Internet) and a mobile operator core network 250 via a DSL router, a cable modem, a wireless link, or other connectivity means (not shown). A mobile switching center (not shown) can also be communicatively coupled to the APs 210, 212 for facilitating handoff between or with APs generally, facilitating Over-The-Air ("OTA") configuration services for APs 210, 212, and/or facilitating communications between the UE 220 and terminals communicating over a circuit-switched network. As will be discussed below, each femto AP 210 may be configured to serve associated UEs 220 (e.g., UE 220A) and, optionally, alien UEs 220 (e.g., UE 220B). In other words, access to femto APs 210 may be restricted whereby a given UE 220 may be served by a set of designated (e.g., home) femto APs 210 but may not be served by any non-designated femto APs (e.g., a neighbor's femto AP) (not shown).

For simplicity of notation, the description will continue using the notation indicative of a single femto AP, i.e., "femto AP 210." However, it is to be understood that the term "femto AP 210" can refer to multiple femto APs, such as APs 210, 212, as appropriate given the description. Additionally, although embodiments described herein use 3GPP terminology, it is to be understood that the embodiments can be applied to 3GPP (Rel99, Rel5, Rel6, Rel7, Rel8) technology, as well as 3GPP2 (1xRTT, 1xEV-DO Rel0, RevA, RevB) technology and other known and related technologies.

Figure 2B:
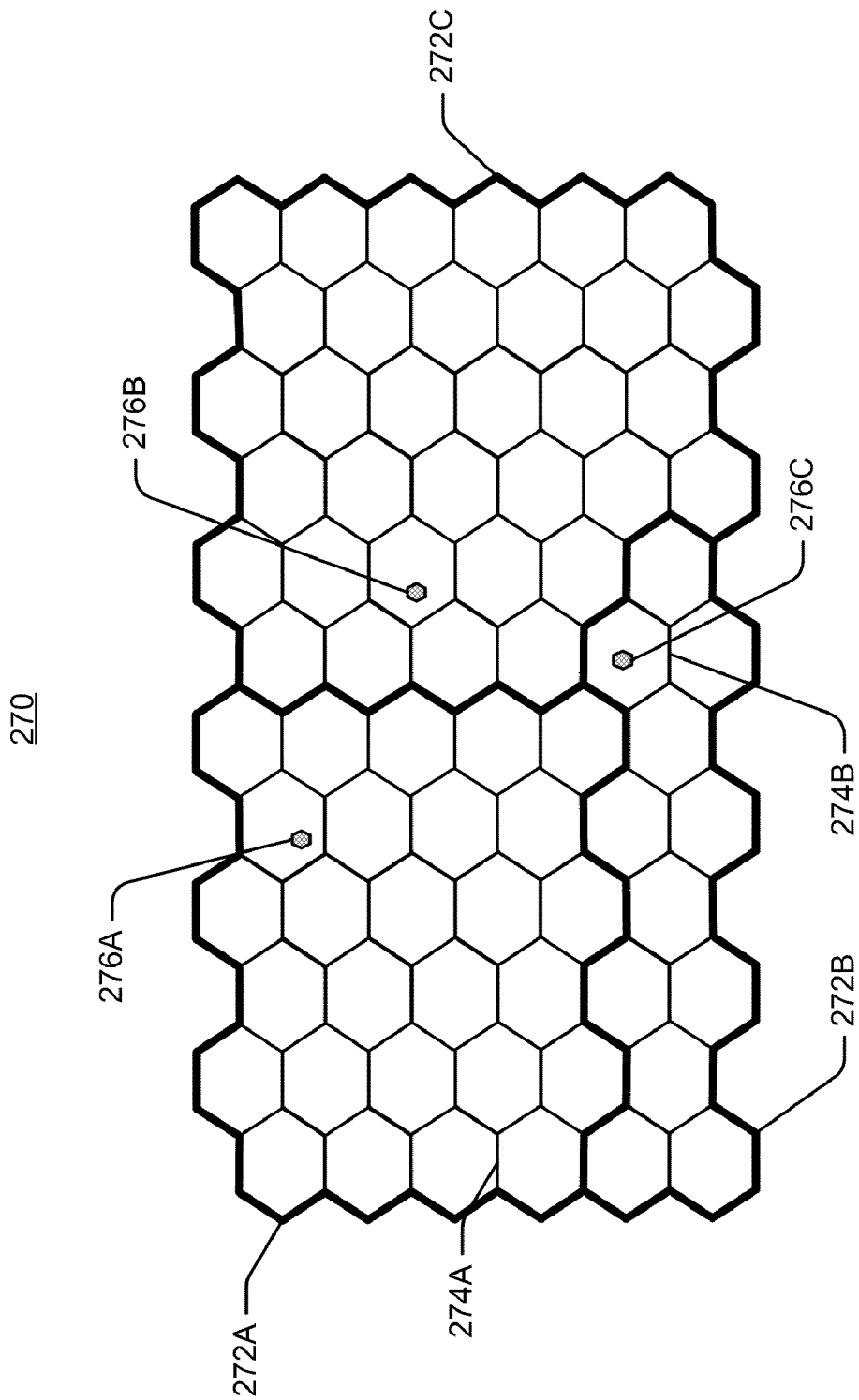
FIG. 2B illustrates an example of a coverage map where several tracking areas (or routing areas or location areas) are defined, each of which includes several macro coverage areas according to an embodiment.

FIG. 2B illustrates an example of a coverage map 270 where several tracking areas 272 (or routing areas or location areas) are defined, each of which includes several macro coverage areas 274. Here, areas of coverage associated with tracking areas 272A, 272B, and 272C are delineated by the wide lines and the macro coverage areas 274 (e.g., 274A, 274B, 274C) are represented by the hexagons. The tracking areas 272 also include femto coverage areas 276 (e.g., 276A, 276B, 276C, 276D). In this example, each of the femto coverage areas 276 (e.g., femto coverage area 276C) is depicted within a macro coverage area 274 (e.g., macro coverage area 274B). It should be appreciated, however, that a femto coverage area 276 may not lie entirely within a macro coverage area 274. In practice, a large number of femto coverage areas 276 may be defined with a given tracking area 272 or macro coverage area 274. Also, one or more pico coverage areas (not shown) may be defined within a given tracking area 272 or macro coverage area 274.

Referring again to FIG. 2A, the owner of a femto AP 210 may subscribe to mobile service, such as, for example, 3G mobile service, offered through the mobile operator core network 250. In addition, a UE 220 may be capable of operating both in macro environments and in smaller scale (e.g., residential) network environments. In other words, depending on the current location of the UE 220, the UE 220 may be served by an access node 260 of the macro cell mobile network 250 or by any one of a set of femto APs 210 (e.g., the femto APs 210 and 212 that reside within a corresponding user residence 214). For example, when a subscriber is outside his home, he is served by a standard macro access node (e.g., node 260) and when the subscriber is at home, he is served by a femto AP (e.g., node 210). Here, it should be appreciated that a femto AP 220 may be backward compatible with existing UEs 220.

A femto AP 210 may be deployed on a single frequency or, in the alternative, on multiple frequencies. Depending on the particular configuration, the single frequency or one or more of the multiple frequencies may overlap with one or more frequencies used by a macro node (e.g., node 260).

In some aspects, a UE 220 may be configured to connect to a preferred femto AP (e.g., the home femto AP 210 of the UE 220) whenever such connectivity is possible. For example, whenever the UE 220 is within the user's residence 214, it may be desired that the UE 220 communicate only with the home femto AP 210.

In some aspects, if the UE 220 operates within the macro cellular network 250 but is not residing on its most preferred network (e.g., as defined in a preferred roaming list), the UE 220 may continue to search for the most preferred network (e.g., the preferred femto AP 210) using a Better System Reselection ("BSR"), which may involve a periodic scanning of available systems to determine whether better systems are currently available, and subsequent efforts to associate with such preferred systems. With the acquisition entry, the UE 220 may limit the search for specific band and channel. For example, the search for the most preferred system may be repeated periodically. Upon discovery of a preferred femto AP 210, the UE 220 selects the femto AP 210 for camping within its coverage area.

A femto AP may be restricted in some aspects. For example, a given femto AP may only provide certain services to certain UEs. In deployments with so-called restricted (or closed) association, a given UE may only be served by the macro cell mobile network and a defined set of femto APs (e.g., the femto APs 210 that reside within the corresponding user residence 214). In some implementations, a node may be restricted to not provide, for at least one node, at least one of: signaling, data access, registration, paging, or service.

In some aspects, a restricted femto AP (which may also be referred to as a Closed Subscriber Group Home NodeB) is one that provides service to a restricted provisioned set of UEs. This set may be temporarily or permanently extended as necessary. In some aspects, a Closed Subscriber Group ("CSG") may be defined as the set of access nodes (e.g., femto APs) that share a common access control list of UEs. A channel on which all femto APs (or all restricted femto APs) in a region operate may be referred to as a femto channel.

Various relationships may thus exist between a given femto AP and a given UE. For example, from the perspective of a UE, an open femto AP may refer to a femto AP with no restricted association. A restricted femto AP may refer to a femto AP that is restricted in some manner (e.g., restricted for association and/or registration). A home femto AP may refer to a femto AP on which the UE is authorized to access and operate on. A guest femto AP may refer to a femto AP on which a UE is temporarily authorized to access or operate on. An alien femto AP may refer to a femto AP on which the UE is not authorized to access or operate on, except for perhaps emergency situations (e.g., 911 calls).

From a restricted femto AP perspective, a home UE may refer to a UE that authorized to access the restricted femto AP. A guest UE may refer to a UE with temporary access to the restricted femto AP. An alien UE may refer to a UE that does not have permission to access the restricted femto AP, except for perhaps emergency situations, for example, such as 911 calls (e.g., a UE that does not have the credentials or permission to register with the restricted femto AP).

For convenience, the disclosure herein describes various functionality in the context of a femto AP. It should be appreciated, however, that a pico node may provide the same or similar functionality for a larger coverage area. For example, a pico node may be restricted, a home pico node may be defined for a given UE, and so on.

A wireless multiple-access communication system may simultaneously support communication for multiple wireless UEs. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 3:
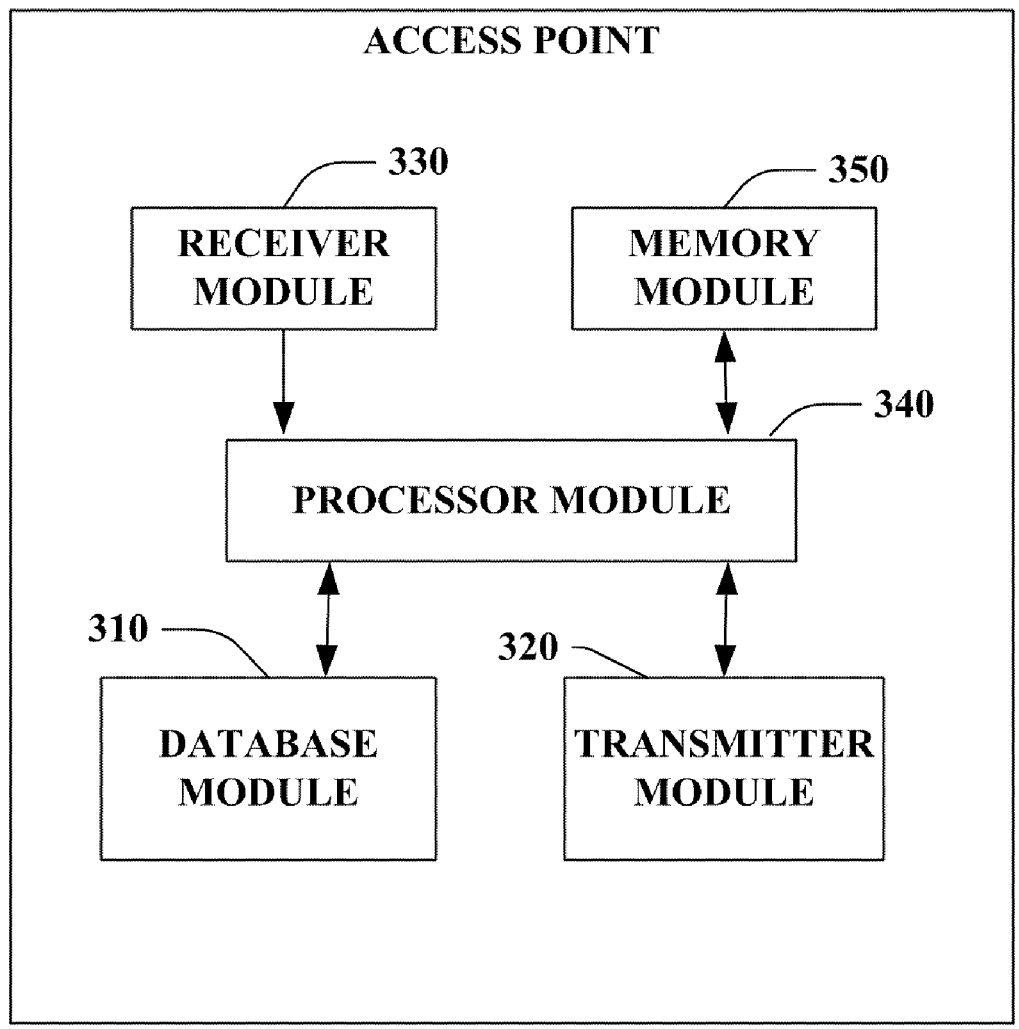
FIG. 3 illustrates an exemplary block diagram of an access point according to an embodiment.

FIG. 3 illustrates an exemplary block diagram of an access point according to an embodiment. Referring to FIGS. 2A and 3, a description of an exemplary AP 210 will now be described. The AP 210 can include a database module 310, a transmitter module 320, a receiver module 330, a processor module 340 and a memory module 350. The database module 310 can be communicatively coupled to the processor module 340, which can be communicatively coupled to the memory module 350. The processor module 340 can be communicatively coupled to the receiver module 330 and the transmitter module 320.

In one or more embodiments, the AP 210 is configured to facilitate identification and/or acquisition of the AP 210 by UEs 220 to which the AP 210 permits access. Similarly, the AP 210 can be configured to prevent acquisition of the AP 210 by UEs 220 to which the AP 210 has not permitted access. If the UE 220 is not permitted to access the AP 210, the UE 220 may optionally continue an ongoing call, or initiate a new call, with another nearby AP or a cellular network. As used herein, the terms "acquire" and "acquisition," can include, but are not limited to, authentication and/or registration with the AP. By way of example, but not limitation, attempting acquisition of an AP can include attempting authentication to the AP.

The memory module 350 can include any number of different types of memory for facilitating identification and/or acquisition of an AP 210. By way of example, but not limitation, the memory module 350 can be a read-only memory, a read-write memory and/or a memory card storing one or more different types of information about the AP 210 including, but not limited to, access point information ("API") indicative of an identifier of the AP 210. The API can be included in a message for identifying the AP 210 to the UE 220 ("APIDM").

The API can be of one or more different forms of information and/or lengths. For example, in one embodiment, the API can be a computer-readable address, including, but not limited to an IP address. The IP address could be an IPv6 address, for example. In some embodiments, the API need not be an IP address or an IPv6 address. In some embodiments, the API can be any information (or any portion of information) capable of identifying the AP 210. In some embodiments, the API can be any computer-readable information capable of being read by a computer and/or processor to identify the AP 210.

In some embodiments, the API can be a human-readable address such as a human-readable text string. For example, a 32 bit text string could be used. The text string could be readable by an owner of the UE 200 to which the API is transmitted could be used. As such, the owner of a UE 220 receiving the API can use the human-readable address to easily identify the AP 210, manually select between one or more AP with ease and/or manage one or more lists of APs to which the UE 220 is permitted to access (e.g., a white list) or to which the UE 220 is not permitted to access (e.g., a black list).

In some embodiments, the text string can be any number of bytes enabling a human operator of the UE 220 to discern the text string given the constraints on the screen of the UE 220 and usage models of the UE 220. In one embodiment, the text string can be 32 bytes, as with the WiFi network name ("WiFi SSID").

In some embodiments, the human-readable address can be a civic address such as that defined in the Internet Engineering Task Force RFC 4776, "Dynamic Host Configuration Protocol (DHCPv4 and DHCPv6) Option for Civic Address Configuration Information," November 2006. The address can support provisioning of a human-readable address in different languages and/or in a format very similar to that used by postal delivery services. The civic address can be 255 octet address in some embodiments.

In some embodiments, the API can include the computer-readable address as well as the human-readable address. As such, in some embodiments, a first API can have a first length and a second API could have a second length. As such, in some embodiments, two or more APIs, of differing lengths and/or differing types of information, could be selectively used by the API based on the need to reduce traffic on the channel on which the API is transmitted, based on the preferences for ease of human use with which the AP 210 might be configured, or otherwise.

In some embodiments, the API can be any length. In some embodiments, the API can be any length allowing a substantial number of APs 210 to have unique APIs without reuse within a system. In some embodiments, the API can be 48 bits long or 128 bits long. In some embodiments, the API can be combined with information indicative of the system with which the AP 210 is associated ("SID") to generate a globally unique identifier. As described herein, when the API is described, such could include the API with or without the SID (and therefore the API in isolation or the globally unique identifier, respectively).

In various embodiments, the API can be configured by a user of the AP 210, a user of a UE 220 associated with the AP 210 and/or by a network operator from a location remote from the AP associated with the API. By way of example, but not limitation, the network operator could provide information for configuring the API through Over-The-Air ("OTA") signaling. Still, in some embodiments, the API can be hardwired or otherwise associated with or stored in the AP 210 at or prior to the time of purchase of the AP 210. Yet still, in various embodiments, the API for a selected AP 210 could be configurable, fixed or dynamic. For example, the API could change over time. The factors determining whether and when the API changes could include, but are not limited to, the amount of time that the API has been the same, the arrival of new APs 210 in close proximity to the AP 210, user choice and/or user or network operator selection of a new or previously-used API or the like.

The memory module 350 can also store information about the AP 210 (that can also be provided in the APIDM) indicative of a frequency on which the AP 210 provides communication, band classes and/or channel bandwidths according to which the AP 210 can provide communication services to the UE 220. As such, a UE 220 permitted to access the AP 210 can learn of the identity of the AP 210, acquire the AP 210 and tune the receiver of the UE 220 to receive communications on the frequency associated with the AP 210.

In other embodiments, the memory module 350 can store, in addition to the API, information indicative of a mobile switching center ("MSC_ID") and/or the geographical (e.g., physical) location or area of the cell that the AP 210 covers ("Cell_ID"). As such, the MSC_ID and the Cell_ID can be provided in the APIDM and accessed by the UE 220 to facilitate handoff from the AP 210 to another AP. In some embodiments, the MSC_ID and the Cell_ID can be analogous in size and placement within the APIDM to that shown for the size and placement of the IOS_MSC_ID and the IOS_Cell_ID within the APIDM as disclosed in Upper Layer (Layer 3) Signaling Standard for cdma2000 Spread Spectrum Systems, Release E, 3GPP2 C.S0005-E, section 3.7.2.3.2.39, Access Point Identification Message, v. 0.3, May 2009. As detailed in the above-referenced standard, the IOS_MSC_ID and the IOS_Cell_ID can be assigned respective values for use by other APs (or network base stations or controllers) for performing handoff with the AP 210.

In other embodiments, the memory module 350 can store, in addition to or in lieu of the API and/or the MSC_ID and/or the Cell_ID, information indicative of the latitude, longitude and/or the altitude of the AP 210. The information indicative of the altitude can be provided to the UE 220 for position location services, providing vertical distinction of APs that are co-located horizontally, and/or for enabling a UE 220 to obtain height information. Further, information indicative of partial almanac macro cell base station information can be tailored for the region of the AP 210 and provided to indicate to the UE 220, the global positioning system ("GPS") location of the pilots of neighboring APs. Further, information indicative of the SID and/or the identification of the network or base station with which the AP 210 or other APs are associated (i.e., "Base_ID" or "NID") can be stored in the AP 210.

The memory module 350 information can be stored in the memory prior to or at the time of purchase and/or stored upon receipt of configuration information through OTA signaling. With reference to FIGS. 2A and 3, for example, the memory module 350 can store information received from the mobile operator core network 250 (e.g., Sprint, Nextel) through OTA signaling to/from the mobile operator core network 250. By way of example, but not limitation, the information through OTA signaling can be for configuring, providing or changing the API for the AP (in cases in which the AP 210 was not hardwired or otherwise pre-configured with the API prior to or at the time of purchase of the AP), the frequency with which the API should be broadcast using a beacon signal of the API, and/or any other operational features of the AP 210. For example, in one embodiment, the mobile operator core network 250 can provide OTA signaling to configure the AP with a selected API, for broadcasting the API on a paging channel to which the UE 220 can receive communications, to transmit the communication at a slot cycle index ("SCI") of 0 (i.e., approximately every 1.28 seconds) or at a slot cycle index of 1 (i.e., approximately every 2.56 seconds).

The database module 310 can be communicatively coupled to the memory module 350 and can store one or more different types of information for facilitation of identification and/ or acquisition of the AP 210 and/or for handoff to or from other APs. For example, the database module 310 can store information indicative of the identity of one or more UEs 220 permitted (or not permitted) to acquire the AP 210. As another example, the database module 310 can store the information indicative of terms of access for the one or more UEs 220 may be permitted to access the AP 210. For example, terms of access can be accessed by the AP 210 in determining whether to allow access based on the time of access, the frequency of access or otherwise.

As another example, the database module 310 can store information indicative of one or more other neighboring APs in geographic proximity to the AP 210. The information can be included as part of a neighbor list. The information indicative of the neighboring APs can include, but is not necessarily limited to, the identities, communication frequencies, band classes and/or channel bandwidths of the neighboring APs. The information can be retrieved from the memory module 350 and broadcast by the AP 210 in a neighbor list message ("NLM"). In some embodiments, the information that would typically be provided in an NLM is stored in a database associated with the UE 220 and the AP 210 need not broadcast the NLM.

In some embodiments, the information stored in the database module 310 indicative of the neighboring APs in geographic proximity to the AP 210 can be enhanced to also include global positioning system ("GPS") information indicative of GPS coordinates of the neighboring APs. The enhanced information can be retrieved from the memory module 350 and broadcast by the AP 210 in an enhanced general neighbor list message ("GNLM") for providing the GPS location of neighboring APs to the UE 220.

In various embodiments, the information stored in the database module 310 and provided in the GNLM can be used by the UE 220 to select an AP listed in the GNLM based on a prioritization of available APs as dictated by the preferred user zone list ("PUZL") priority scheme and database that can be configured in the UE 220 as defined in "Over-the-Air Service Provisioning of Mobile Stations in Spread Spectrum Systems," published as TIA-683-C, March 2003, which is incorporated herein by reference. The GNLM can therefore allow the use of the PUZL entries in the database module of the UE 220 for specifying a smaller radius of acceptable APs from which the UE 220 can select for potential acquisition. The GNLM can also be used to restrict the geographical region over which the UE 220 scans for APs.

In various embodiments, the database module 310 can be provided information through configuration via a memory card, temporary or permanent manual or other programming of the database module prior to or at the time of purchase of the AP 210 and/or OTA signaling from a mobile operator core network 250.

The transmitter module 320 and the receiver module 330 can be communicatively coupled to the processor. The transmitter module 320 can be configured to broadcast within the geographical area covered by the AP 210, the API.

The transmitter module 320 could be configured to be controlled by the processor module 340 to broadcast the API based on the type or length of the API. For example, the transmitter module 320 of the AP 210 could broadcast a first API having a first length at a first frequency and a second API having a second length at a second frequency. If the length of the first API is longer than the length of the second API (e.g., if the first API includes the computer-readable address and the human-readable address while the second API includes only the computer-readable address), the frequency at which the first API is broadcast could be less than the frequency at which the second API is broadcast.

Further, the transmitter module 320 could be configured to broadcast any API on a selected channel and occurring selected frequency. By way of example, but not limitation, the API could be broadcast on a paging channel to which the UE 220 is configured to listen. In some embodiments, the API can be transmitted in an existing message on the paging channel (e.g., a System Parameter Message on the paging channel for cdma2000 1xRTT or a Sector Parameter Message on the paging channel for cdma2000 1xEV-DO).

For example, the API could be interspersed between other paging channel traffic at regularly-occurring intervals including, but not limited to, approximately every 1.28 seconds, approximately every 2 seconds or otherwise. In embodiments, the API can be transmitted at predetermined time slots to reduce the likelihood that a UE 220 will not receive the API. A longer API (e.g., an API having computer-readable address and a human-readable address) could be broadcast every 10 seconds, for example, while a shorter API (e.g., an API having a computer-readable address but not having a human-readable address) could be broadcast at greater time intervals. For example, shorter APIs could be broadcast every approximately 1.28 seconds or approximately 2 seconds.

In various embodiments, the time intervals for transmitting the API can be randomly-determined, fixed, dynamic and/or configurable. For example, a network operator can transmit to the AP 210 information regarding the time interval over which or during which to transmit the AP.

In various embodiments, any time intervals can be used generally following the principle that the computer-readable address is more critical information than the human-readable address. As such, in one embodiment wherein different types of APIs are broadcast, each API broadcast contains a computer-readable address (in addition to or in lieu of other types of addresses identifying the AP 210). More critical information (e.g., a computer-readable address) can be transmitted more frequently than less critical information (e.g., a human-readable address) in various embodiments.

The channel on which the API is broadcast and/or the intervals at which the broadcasts occur can be fixed or change over time. Further, the channel and/or the intervals for broadcasting the API can be programmed into the AP 210 prior to or at the time of purchase or after purchase. For example, such information could be configured by OTA signaling. For example, the mobile operator core network could determine the intervals at broadcasting and/or update the intervals or channels based on any number of factors, including, but not limited to, traffic conditions, channel conditions, etc.

The receiver module 330 can be configured to receive from the UE 220 information for attempting acquisition of the AP 210. In some embodiments, the receiver module 330 can be configured to receive a first signal including a registration request from a UE 220 proximate to a geographical area covered by the AP 210.

The processor module 340 can be communicatively coupled to the transmitter module 320, the receiver module 330, the database module 310 and the memory module 350. The processor module 340 can be configured to facilitate identification and/or acquisition of the AP 210 (and/or handoff to or from other APs or networks). In some embodiments, the processor module 340 can access one or more codes stored on a computer-readable medium (such as could be stored as part of the memory module 350) for facilitating the identification and/or acquisition. In some embodiments, the processor module 340 can include any hardware, software and/or a combination of hardware and software for facilitating identification and/or acquisition of AP 210 (and/or handoff to or from other APs or networks) as described herein.

In various embodiments, the processor module 340 can be configured to generate the API (or APIDM) and control the transmitter module 320 to broadcast the API. The API can be broadcasted in the APIDM or in any other signal able to be received by the UE 220.

The processor module 340 can also be configured to compare the stored information indicative of the one or more UEs 220 permitted to access the AP 210, with a UE requesting registration with the AP 210 in response to the transmitted APIDM. As noted above, the information indicative of the one or more UEs 220 permitted to access the AP 210 can be stored in the database memory 310. In response to finding a match between the requesting UE and the information indicative of the one or more UEs 220 permitted to access the AP 210, the processor module 340 can control the AP 210 to provide access to the UE 220. By contrast, in response to finding no match between the requesting UE and the information indicative of the one or more UEs 220 permitted to access the AP 210, the processor module 340 can control the AP 210 to not provide access to the UE 220.

In some embodiments, the processor module 340 can be configured to execute codes stored on a computer-readable medium that can be associated with the memory module 350, for example. The computer-readable medium could store codes on the computer-readable medium that, when executed by the processor module 340, cause the AP 210 to perform selected functions. A first set of codes could be for causing the AP 210 to transmit the API indicative of an identification of the AP 210. A second set of codes could be for causing the AP 210 to receive, using the receiver module 330, information indicative of a registration request from a UE 220 in response to transmitting the API. The registration request could be transmitted when the UE 220 determines that the AP 210 is a permitted access point ("PAP"). As used herein, the term "PAP" shall mean an AP that the UE 220 is permitted to access. In some embodiments, a third set of codes could be for determining whether the UE 220 is authorized to receive access to the AP 210, and a fourth set of codes could be for causing the AP 210 to provide access for the UE 220 to register with the AP 210. In some embodiments, access could be provided in response to receiving the registration request from the UE 220 and determining that the UE 220 is authorized to receive access to the AP 210. Further, in various embodiments in which handoff must be performed to the AP 210 from a macro network, the methods later-described with reference to FIG. 9A and FIGS. 10A and 10B can be used.

Figure 4A:
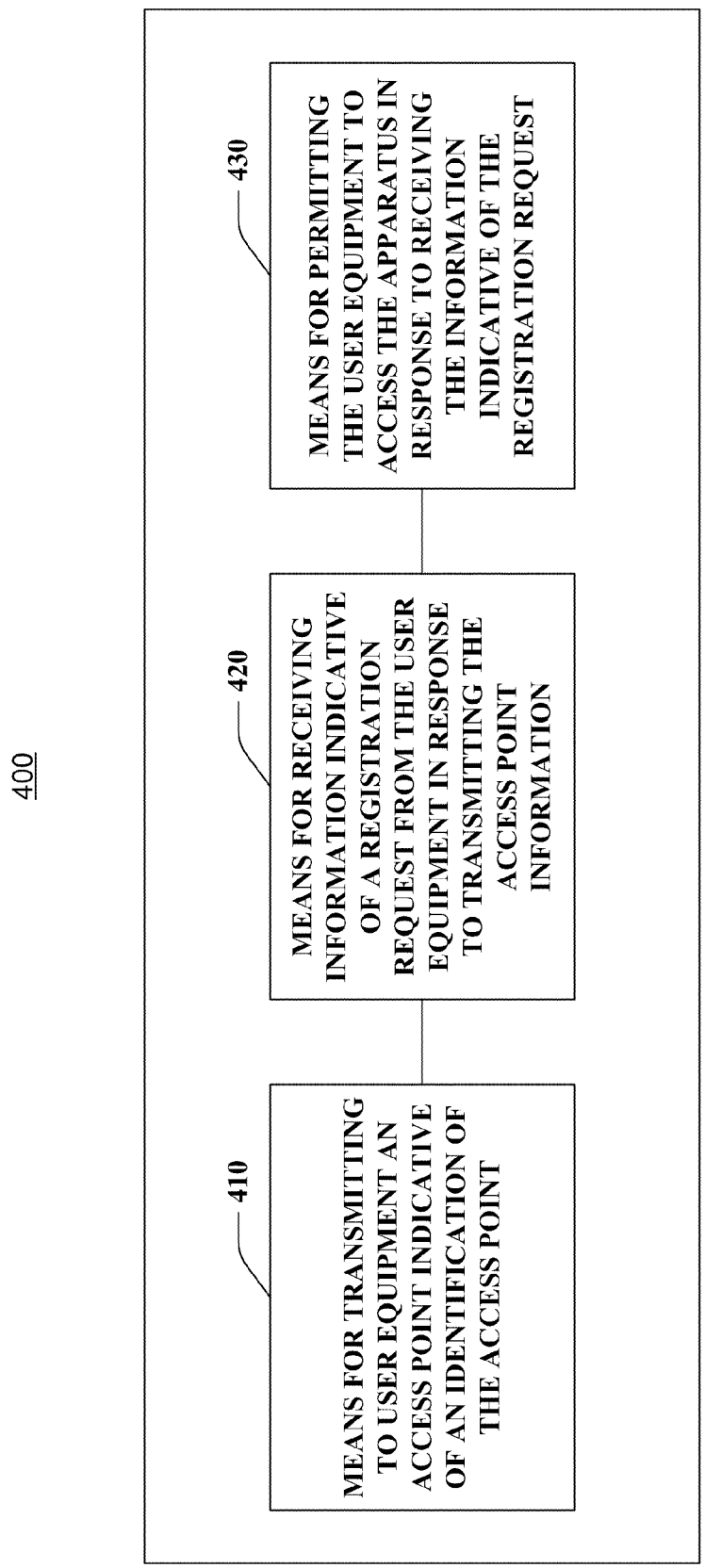
FIG. 4A illustrates another exemplary block diagram of an access point according to an embodiment.

FIG. 4A illustrates another exemplary block diagram of an access point according to an embodiment. The AP 400 can include means for transmitting 410 an API indicative of an identification of the AP 400. In various embodiments, the means for transmitting 410 can include, but is not limited to, a transmitter, a transceiver or a transmitter module, such as that described with reference to FIG. 3 as transmitter module 320. The AP 400 can also include means for receiving 420 a registration request from a UE 220 in response to transmitting the API. In various embodiments, the means for receiving 420 can include, but is not limited to, a receiver, a transceiver or a receiver module, such as that described with reference to FIG. 3 as receiver module 330. The registration request can be transmitted to the AP 400 from the UE 220 if the UE 220 determines that the AP 400 is a PAP. The AP 400 can also include means for permitting 430 the user equipment to access the apparatus in response to receiving the information indicative of the registration request. In some embodiments, the means for permitting 430 the user equipment to access the apparatus includes means for determining (not shown) whether the UE 220 is authorized to receive access to the AP 400 and means for providing (not shown) access for the UE 220 in response to determining that the UE 220 is authorized to receive access to the AP 400. In various embodiments, the means for permitting 430, the means for determining whether the UE is authorized to receive access to the AP 400 and/or the means for providing access can include, but is not limited to, a processor or a processor module, such as that described with reference to FIG. 3 as processor module 340.

Numerous methods for facilitating and/or acquisition of an AP can be provided. By way of example, but not limitation, in some embodiments, a method can include a sole step of facilitating identification and acquisition of an AP by transmitting an API indicative of an identification of the AP. The API can be transmitted to a UE in geographic proximity to the AP.

Figure 4B:
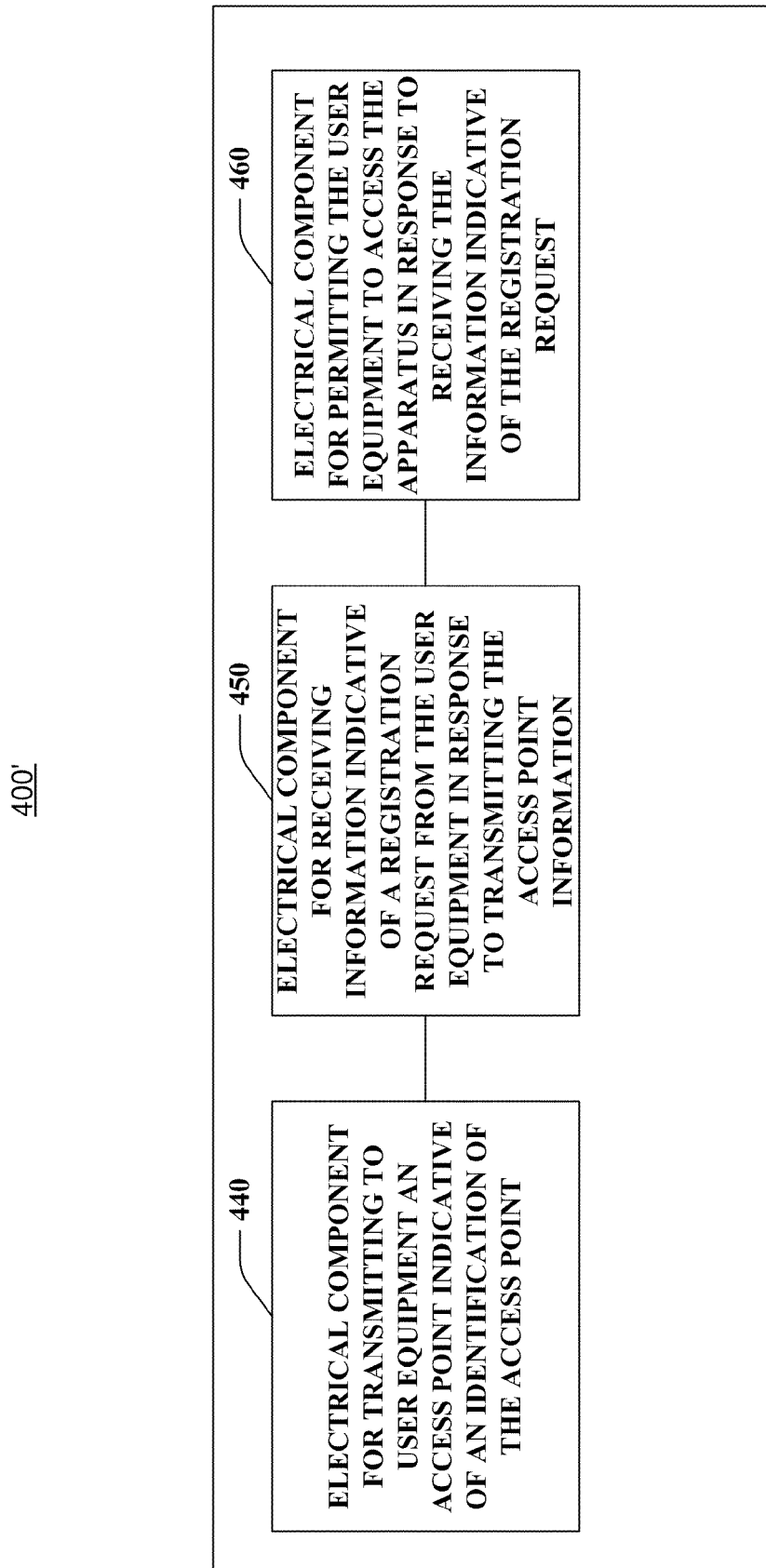
FIG. 4B illustrates another exemplary block diagram of an access point according to an embodiment.

FIG. 4B illustrates another exemplary block diagram of an access point according to an embodiment. The AP 400' can include an electrical component for transmitting 440 an API indicative of an identification of the AP 400'. The AP 400' can also include an electrical component for receiving 450 a registration request from a UE 220 in response to transmitting the API. The registration request can be transmitted to the AP 400' from the UE 220 if the UE 220 determines that the AP 400' is a PAP. The AP 400' can also include an electrical component for permitting 460 the user equipment to access the apparatus in response to receiving the information indicative of the registration request. In some embodiments, the means for permitting 460 the user equipment to access the apparatus includes means for determining whether the UE 220 is authorized to receive access to the AP 400' and providing access for the UE 220 in response to determining that the UE 220 is authorized to receive access to the AP 400'.

Figure 5:
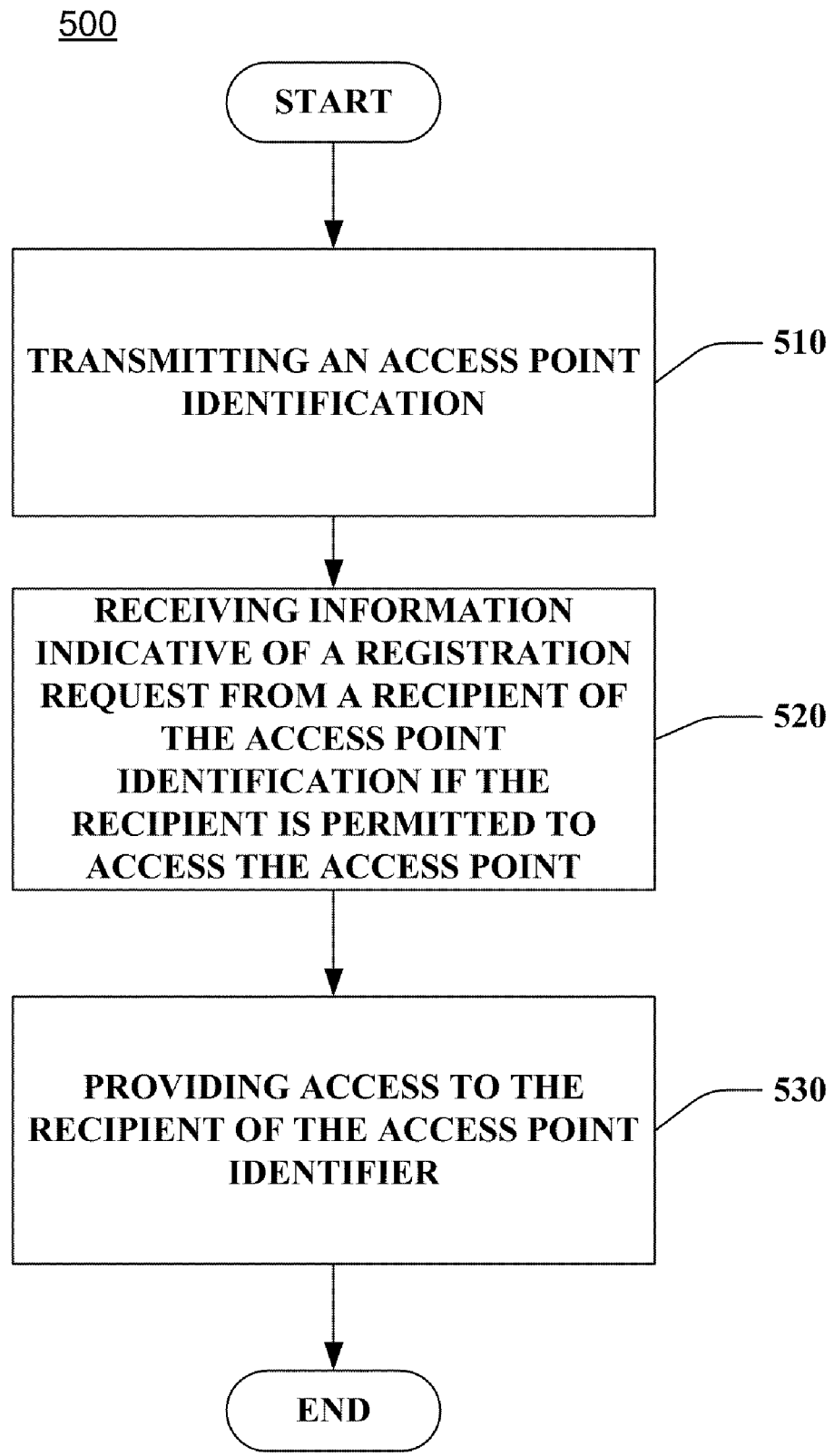
FIG. 5 illustrates an exemplary flowchart of a method for facilitating identification and/or acquisition of an access point according to an embodiment.

FIG. 5 illustrates an exemplary flowchart of a method for facilitating identification and/or acquisition of an AP according to embodiments. In some embodiments, methods can include any of the processes and/or functions described above for identification and acquisition of the AP 210 with reference to FIGS. 3, 4A and/or 4B (and can include any one or more of such described features). In some embodiments, the method 500 can include executing a hardware, software, a combination of hardware and software, and/or specialized circuitry or computer code to perform one or more of the steps of method 500. For example, method 500 can include executing a processor for performing one or more of the steps of method 500. In some embodiments, the method 500 is as described below.

At 510, an API can be transmitted. The API can be of any form described above with reference to FIGS. 2A, 3, 4A and/or 4B. For example, in various embodiments, the API can be configured by a user of the AP 210, a user of a UE 220 associated with the AP 210 and/or by a network operator from a location remote from the AP associated with the API. By way of example, but not limitation, the network operator could provide information for configuring the API through Over-The-Air ("OTA") signaling. Still, in some embodiments, the API can be hardwired or otherwise associated with or stored in the AP 210 at or prior to the time of purchase of the AP 210. Yet still, in various embodiments, the API for a selected AP 210 could be configurable, fixed or dynamic. For example, the API could change over time. The factors determining whether and when the API changes could include, but are not limited to, the amount of time that the API has been the same, the arrival of new APs 210 in close proximity to the AP 210, user choice and/or user or network operator selection of a new or previously-used API or the like.

As another example, in various embodiments, the API can include a computer-readable address, a human-readable address, an MSI_ID, and a Cell_ID. In some embodiments, the API can include a computer-readable address, a human-readable address, an MSI_ID, and a Cell_ID, a Base_ID, an SID, an and/or information indicative of a latitude, longitude and/or altitude. With reference to FIGS. 2A, 2B, 3, 4A and/or 4B, the computer-readable address, a human-readable address, an MSI_ID, and a Cell_ID, a Base_ID, an SID, an and/or information indicative of a latitude, longitude and/or altitude can be associated with the AP 210 or the AP 400.

In various embodiments, the API can be interspersed on a paging channel. The API can be transmitted at any predetermine time intervals or time slots including, but not limited to, every message every approximately 1.28 seconds (e.g., for an SCI of 0), every approximately 2.0 seconds (e.g., for an SCI of 1), every approximately 10 seconds or otherwise.

The time intervals can be fixed, configurable and/or variable and can be permanent or changed from time to time. The channel or time intervals or length or type of API transmitted can be transmitted based on information programmed prior to or at the time of purchase of a mechanism for transmitting the API and/or after provisioning of corresponding configuration information that can be provided via OTA signaling. As such, in some embodiments, as described above, configuration information is received for associating the transmitter of the API with the AP prior to transmitting the API.

In some embodiments, the API can be broadcast in a new message, including, but not limited to, a Sector Identification Message. In some embodiments, the API can be transmitted in an existing message on the paging channel (e.g., a System Parameter Message on the paging channel for cdma2000 1xRTT or a Sector Parameter Message on the paging channel for cdma2000 1xEV-DO).

At 520, the transmitter of the API can receive information indicative of a registration request from a recipient of the API permitted to access the transmitter of the API, and does not receive a registration request from a recipient of the API not permitted to access the transmitter of the API. In some embodiments, the information indicative of the registration request is received only after confirmation that the transmitter of the information has confirmed that the transmitter is permitted to access the recipient of the information indicative of the registration request.

With reference to FIGS. 2A, 2B, 3, 4A and/or 4B, the information indicative of the registration request can be received from a UE 220 in geographic proximity to an AP 210, 400 for which the AP 210, 400 is a PAP. As such, in some embodiments, the method 500 can include processes for reducing battery power expended by the AP 210, 400 (in the case of a mobile AP that uses battery power) and/or traffic to the AP 210, 400 to that which is caused by a registration request initiated by a UE 220 permitted to access the AP 210, 400.

At 530, access can be provided to the transmitter of the information indicative of the registration request. With reference to FIGS. 2A, 2B, 3, 4A and/or 4B, access can be provided by the AP 210, 400.

It is assumed that the transmitter will only can transmit information indicative of the registration request after confirming that the transmitter is authorized to access the transmitter of the API and will not transmit information indicative of the registration request if the transmitter is not authorized to access the transmitter of the API. However, in some embodiments, information indicative of the registration request can be received from a transmitter that is not permitted access. In such embodiments, the method 500 can also include, prior to 530 wherein access is provided, the transmitter of the API confirming that the transmitter of the information indicative of the registration request is permitted access. In such embodiments, referring to FIGS. 2A, 2B, 3, 4A and/or 4B, the method 500 can also include an AP 210 that receives the information indicative of the registration request, comparing the information indicative of the identities of the UEs 220 to which access is permitted with the identity of the UE 220 from which the information indicative of the registration request is received to determine whether the UE 220 is permitted access.

Figure 6:
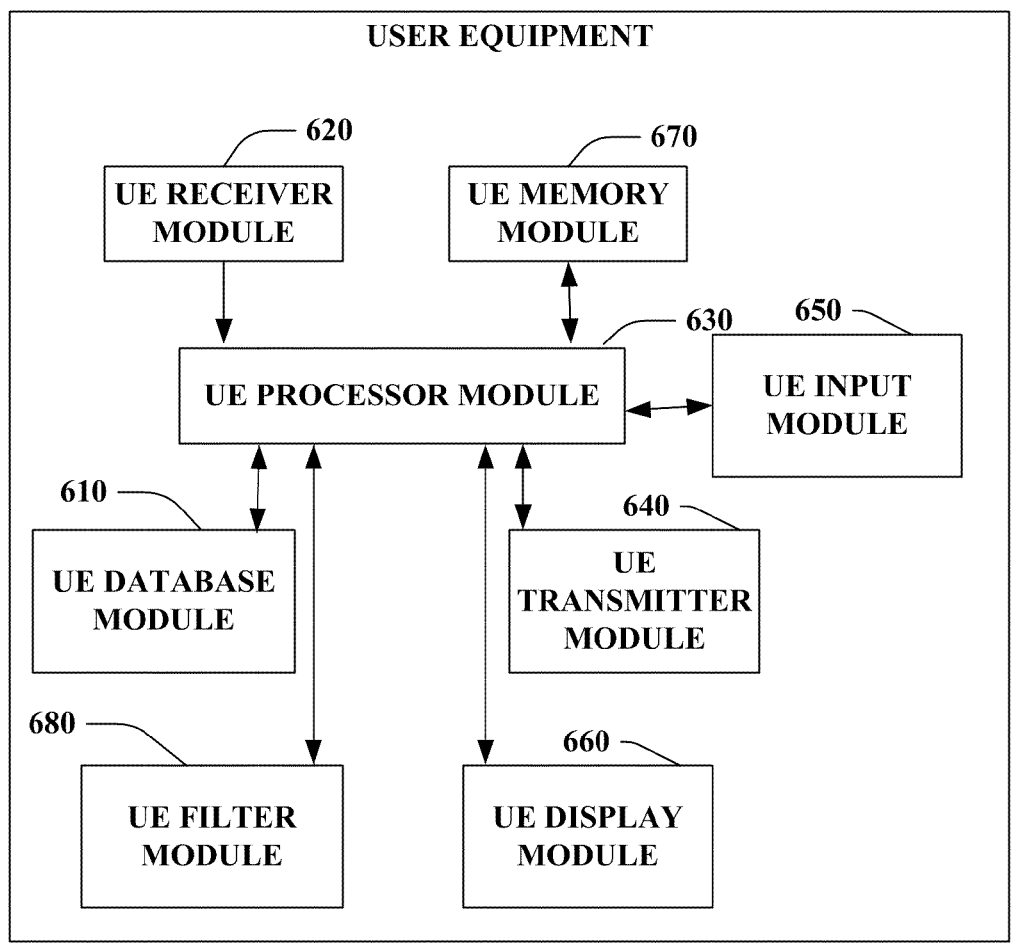
FIG. 6 illustrates an exemplary block diagram of user equipment according to an embodiment.

FIG. 6 illustrates an exemplary block diagram of user equipment according to an embodiment. With reference to FIGS. 3, 4A, 4B, 5 and/or 6, an exemplary embodiment of the UE 220 will now be described. The UE 220 can include a UE database module 610, a UE receiver module 620, a UE processor module 630, a UE transmitter module 640, a UE input module 650, a UE memory module 670 and/or a UE filtering module 680. In some embodiments, the UE 220 can also include a display module 660. The UE database module 610 can be communicatively coupled to the UE processor module 630, which can be communicatively coupled to the UE memory module 670. The UE processor module 630 can be communicatively coupled to the UE receiver module 620, the UE transmitter module 640, the UE memory module 670 and the UE filtering module 680.

In one or more embodiments, the UE 220 is configured to facilitate identification and/or acquisition of an AP 210 to that is a PAP for the UE 220. In embodiments, the UE 220 can be configured to attempt acquisition of the AP 210 by if the AP 210 is a PAP. By contrast, the UE can be configured to forgo attempting to access the AP 210 if the AP is not a PAP. If the UE 220 is not permitted to access the AP 210, the UE 220 may optionally continue an ongoing call, or initiate a new call, with another nearby AP or a cellular network.

The UE memory module 670 can include any number of different types of memory for facilitating identification and/or acquisition of an AP 210. By way of example, but not limitation, the memory module 350 can be a read-only memory, a read-write memory and/or a memory card storing one or more different types of information about the AP 210 including, but not limited to, one or more API for one or more APs 210. The API can be any type or length of API, broadcasted on any channel and/or at any predetermined time intervals as described above with reference to FIGS. 3, 4A, 4B and/or 5.

The UE memory module 670 can also store information for performing handoff between the AP 210 and another AP (or a network), including, but not limited to, the MSC_ID, the Cell_ID, an SID, a Base_ID, an NID, information received in an NLM, a GLM, an APIDM or otherwise. By way of examples, but not limitation, as discussed above with reference to FIGS. 3, 4A, 4B and/or 5, in addition to an API for an AP 210, the UE memory module 670 can store information indicative of frequencies on which one or more AP 210 transmits, radio technologies, etc.

In some embodiments, when only selected frequency bands can be used, the NLM can include information indicative of a plurality of frequency bands and/or pseudo noise ("PN") offsets of vertical (e.g., different frequency) AP neighbors, and horizontal (e.g., same frequency) AP neighbors. The UE 220 can scan for APs using such information. Referring to FIG. 2A, the mobile operator core network 250 can configure the NLM to broadcast this scan/deployment information within each geographic region and/or from each AP 210. In some embodiments, when the AP is a femto cell, the scan can be a femto scan. As such, the UE 220 would not need to be pre-configured with the scan information. Such could be particularly useful when the UE 220 is roaming.

In embodiments when all available frequency bands can be used, the NLM need not specify frequency information. In these embodiments, the UE memory module 670 can store acquisition table information associated with the geographical region indicator ("GEO") of operation. If the current GEO of operation is not know, such as when the UE 220 goes out of service after receiving an NLM, the UE 220 can scan all of the channels in the acquisition table.

In some embodiments, the NLM information can be processed by the UE processor module 630 to aid the UE 220 in manual scans and/or initial acquisition of APs.

In some embodiments, the UE memory module 670 can store the NLM information once it acquires the information and the UE 220 can use the stored information to scan for APs when no macro coverage is available. In other embodiments, the UE 220 can use the scan information that is previously-stored in the UE memory module 670 to optimally scan for APs. The UE 220 can do employing better system re-identification ("BSR") with a preferred roaming list ("PRL") that can also be stored on the UE memory module 670. The PRL method is defined in 3GPP2 C.S0016, "Over-The-Air-Service-Provisioning Specification," TIA-683).

The BSR with PRL can control the APs to which a UE 220 can access based on the frequencies and pseudo noise sequences ("PNs") associated with the APs in the geographic area in which the UE 220 is located.

The UE memory module 670 information can be stored in the UE memory module 670 prior to or at the time of purchase and/or stored upon receipt of configuration information through OTA signaling. With reference to FIG. 2A, for example, the UE memory module 670 can store information received from the mobile operator core network 250 (e.g., Sprint, Nextel) through OTA signaling to/from the mobile operator core network 250. By way of example, but not limitation, the configuration information through OTA signaling (or through manual or other configuration at or at a location proximate to the UE 220) that can be stored in the UE memory module 670 can be any information for operating the UE 220 and/or for facilitating identification and/or acquisition of the AP 210 (or any other AP or network to which the UE 220 can communicate). By way of example, but not limitation, the UE memory module 670 can store information indicative of the identity of the UE and/or information indicative of radio technology specifications by which the UE communicates.

The UE database module 610 can be communicatively coupled to the UE memory module 670 and can store one or more different types of information for facilitation of identification and/or acquisition of the AP 210 and/or for handoff to or from other APs (or networks). For example, the UE database module 610 can store information indicative of the identity of one or more APs that it is permitted (or not permitted) to access. In some embodiments, the information indicative of the APs that the UE 220 is permitted to access can be stored in a white list while the APs that the UE 220 is not permitted to access can be stored in a black list. In some embodiments, the white list and the black list are not stored in the UE database module 610. Rather, the information indicative of the white list and the black list are stored in a location remote from the UE 220 and merely accessible by the UE 220 over a communication channel or otherwise.

As another example, the UE database module 610 can store the information indicative of terms of access for the AP 210. As another example, the UE database module 610 can store information indicative of PUZL entries for a geographical region in which the UE 220 is located. The PUZL entries can be used by the UE 220 to determine which AP to access, of any number of APs that the UE 220 is permitted to access in a geographical area. As other examples, the database module 610 can store information about other APs (or networks) other than the AP from which the UE 220 has received an API. Information about the other APs (or networks) can be used to perform handoff. In some embodiments, the handoff can be performed according to the methods described below with reference to FIGS. 9A and 9B.

The UE receiver module 620 can be disposed to receive an API (included in an APIDM, a System Parameter Message on the paging channel for cdma2000 1xRTT, a Sector Parameter Message on the paging channel for cdma2000 1xEV-DO or otherwise, according to the system with which the UE 220 is configured to operate). In one embodiment, the UE receiver module 620 can be configured to receive, and the UE processor module 630 configured to process, an MSC_ID and cell_ID of an AP 210 (in addition to an API of the AP 210) that is a target of the UE 220 during an active call handoff.

The UE processor module 630 can be coupled to the UE filter module 680, the UE receiver module 620 and the UE database module 610. In one embodiment, the UE processor module 630 can be configured to compare the API received by the U receiver module 620 from an AP 210 with the APIs stored on the white list (or the black list) associated with the UE 220 to determine whether the UE 220 is permitted (or not permitted) to access the AP 210. In one embodiment, if the API corresponds to information on the white list associated with the UE 220, the UE processor module 630 controls the UE transmitter module 640 to attempt acquisition of the AP 210. By contrast, if the API corresponds to information on the black list associated with the UE 220 (or if the UE compares only the white list of the UE 220 to the API and the API does not correspond to any information on the white list), the UE processor module 630 controls the UE transmitter module 640 such that no attempt at acquisition of the AP 210 is made by the UE 220. In other embodiments, the UE 220 can similarly check the black list to which it is associated as a first (or only resort) to determine whether the UE 220 is permitted to access the AP 210. As such, the UE 220 can reduce the use of battery power expended to access an AP 210 to which it is not permitted to access.

In some embodiments, the UE filter module 680 masks a portion of the API received at the UE receiving module 620 such that the UE processor module 630 compares with the UE 220 black list (or white list) only the portion of the API that is unmasked. For example, in some embodiments, the API can include a first portion that is a subnet identifier indicative of a common enterprise to which the AP 210 is affiliated, and a second portion that is an AP identifier indicative of the AP within the subnet. The subnet identifier can have a fewer number of bits than the AP identifier. The UE filter module 680 can filter the API such that the portion of the API corresponding to the subnet identifier is compared by the UE processor module 630 with the UE 220 black list (or white list). As such, processing power expended by the UE 220 to process APIs can be reduced as the UE 220 can determine whether the AP 210 is not a permitted AP based on processing only the portion of the API corresponding to the subnet identifier to which the AP 210 is affiliated. By contrast, in some embodiments, if the portion of the API is on the white list, the UE 220 can attempt acquisition of any AP from which it is receiving an API in the geographical area that is affiliated with the subnet. The masked version of the API, can be an AP subnet ID, similar to that of an EV-DO subnet ID.

In some embodiments, the UE processor module 630 can be configured to execute codes stored on a computer-readable medium that can be associated with the UE memory module 670, for example. The computer-readable medium could store codes on the computer-readable medium that, when executed by the UE processor module 630, cause the UE 220 to perform selected functions. A first set of codes could be for causing the UE 220 to receive API indicative of an identification of an AP 210. The computer-readable medium can also include a second set of codes for causing the UE 220 to attempt acquisition of the AP 210 in response to determining that the AP 210 is a PAP. The computer-readable medium can also include a third set of codes for causing the UE 220 to fail to attempt acquisition of the AP 210 in response to determining that the AP 210 is not a PAP.

The UE input module 650 could be communicatively coupled to the UE processor module 630 and the UE display module 660. The UE input module 650 can be configured to receive manual input at the UE 220 for controlling the configuration and/or operation of the UE 220. For example, in cases when the API received at the UE receiver module 620 includes a text string or other human-readable information, the UE display module 660 can display the identity of the AP 210 that transmitted the API and the input module 650 can receive inputs for updating the black or white list with the API, selecting the API or otherwise.

Referring back to the UE processor module 630, in some embodiments, the UE processor module 630 is also configured to execute commands for modifying a pilot signal measurement message ("PSMM") generated by the UE 220. The PSMM can include information indicative of the MSC_ID and the Cell_ID. The UE transmitter module 640 can be configured to transmit the modified PSMM for use during handoff.

In other embodiments, a second message can be generated by the UE 220. In these embodiments, in lieu of the PSMM including the MSC_ID and the Cell_ID, the second message can include the MSC_ID and the Cell_ID. The second message can be a supplemental or companion message to the PSMM. By way of example, but not limitation, the second message can be a Handoff Supplementary Information Notification Message ("HSINM").

In various embodiments, the UE processor module 630 can be configured to facilitate idle handoff, active handoff and/or AP discovery.

Figure 7A:
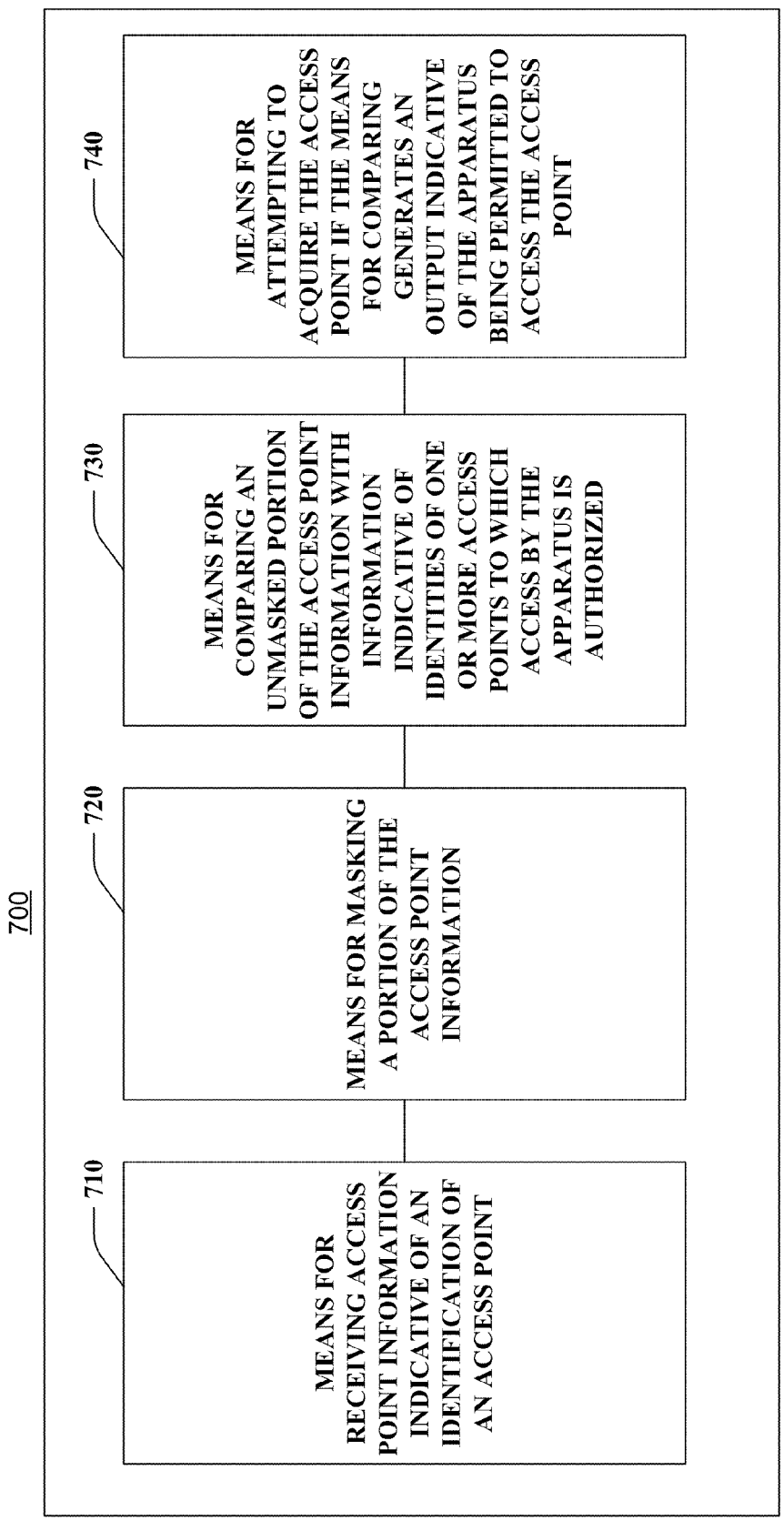
FIG. 7A illustrates another exemplary block diagram of user equipment according to an embodiment.

FIG. 7A illustrates another exemplary block diagram of user equipment according to an embodiment. The UE 700 can include means for receiving 710 API indicative of an identification of an access point (not shown). In various embodiments, the means for receiving 710 can include, but is not limited to, a receiver, a transceiver or a receiver module, such as that described with reference to FIG. 6 as the UE receiver module 620. The UE 700 can also include means for masking 720 a portion of the API. In various embodiments, the means for masking 720 can include, but is not limited to, a filter or a UE filter module, such as that described with reference to FIG. 6 as UE filter module 680. The UE 700 can also include means for comparing 730 the unmasked portion of the API with information indicative of identities of one or more access points to which access by the UE 700 is authorized. In various embodiments, the means for comparing 730 can include, but is not limited to, a processor, a comparator or a processor module, such as that described with reference to FIG. 6 as UE processor module 630. The UE 700 can also include means for attempt to register 740 with the UE 700 if the unmasked portion of the API is indicative of the access point (not shown) being a PAP. In various embodiments, the means for attempting to register 740 can include, but is not limited to, a transmitter, a transceiver or a transmitter module, such as that described with reference to FIG. 6 as UE transmitter module 640. In some embodiments, the UE 700 can include means for preventing (not shown) the UE 700 from attempting to register with the access point if the access point is not a PAP. In various embodiments, the means for preventing can include, but is not limited to, a processor or a processor module, such as that described with reference to FIG. 6 as UE processor module 630.

Figure 7B:
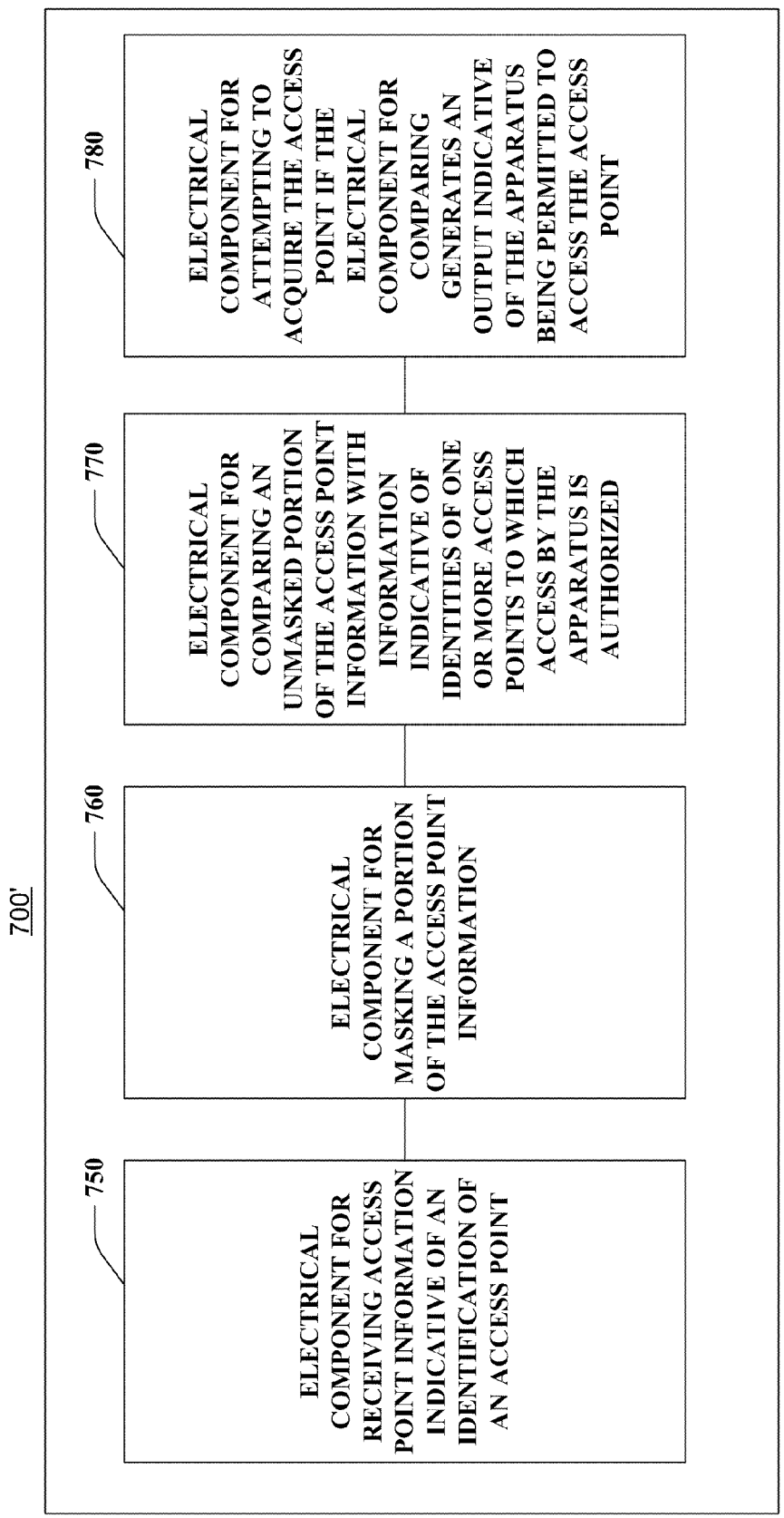
FIG. 7B illustrates another exemplary block diagram of an access point according to an embodiment.

FIG. 7B illustrates another exemplary block diagram of user equipment according to an embodiment. The UE 700' can include an electrical component for receiving 750 API indicative of an identification of an access point (not shown). The UE 700' can also include an electrical component for masking 760 a portion of the API. The UE 700 can also include an electrical component for comparing 770 the unmasked portion of the API with information indicative of identities of one or more access points to which access by the UE 700' is authorized. The UE 700' can also include an electrical component for attempt to register 780 with the UE 700' if the unmasked portion of the API is indicative of the access point (not shown) being a PAP. In some embodiments, the UE 700' can include an electrical component for preventing (not shown) the UE 700' from attempting to register with the access point if the access point is not a PAP.

Figure 8:
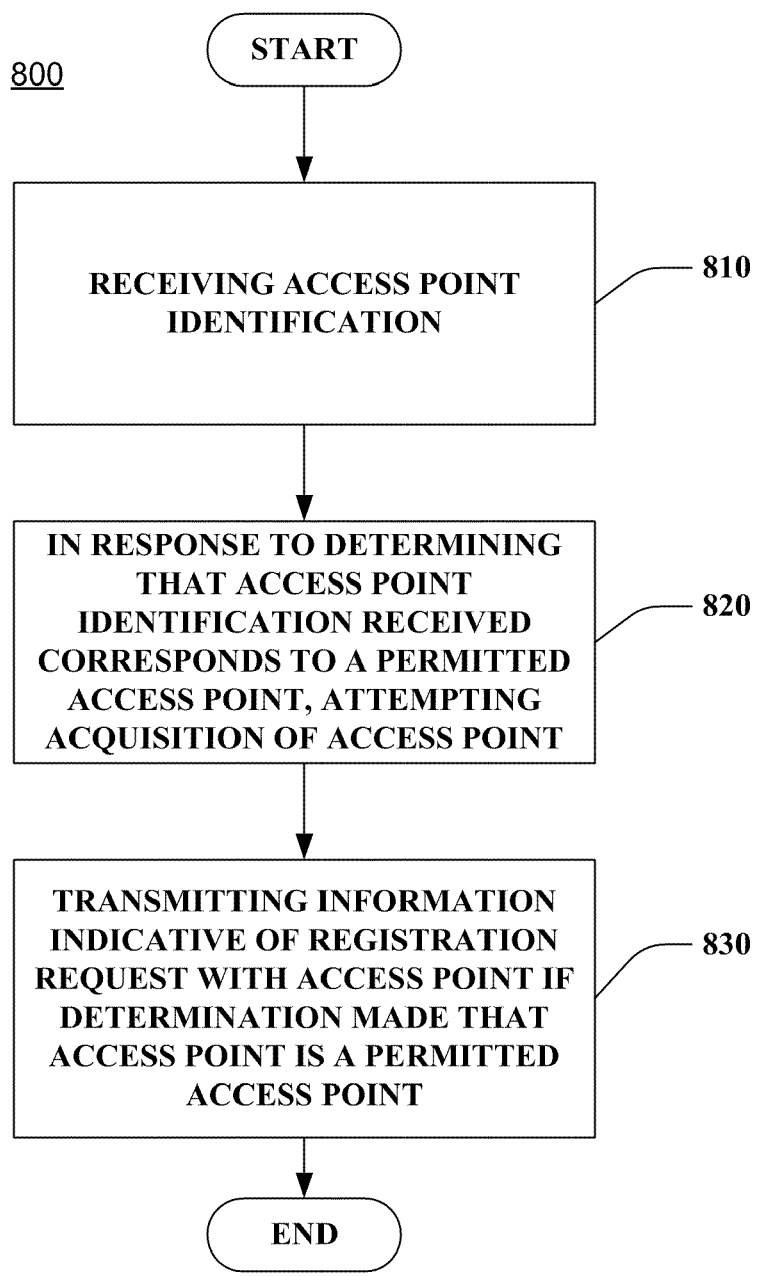
FIG. 8 illustrates an exemplary flowchart of a method for facilitating acquisition of an access point according to an embodiment.

FIG. 8 illustrates an exemplary flowchart of a method for facilitating acquisition of an access point according to an embodiment. The methods described herein can use any of the one or more functions described to be performed by the UE with reference to FIGS. 3, 4A, 4B, 5, 6, 7A and/or 7B. In some embodiments, the method 800 can include executing a hardware, software, a combination of hardware and software, and/or specialized circuitry or computer code to perform one or more of the steps of method 800. For example, method 800 can include executing a processor for performing one or more of the steps of method 800. In some embodiments, method 800 is as follows.

At 810, an API can be received. Referring to FIGS. 2A, 2B, 3, 4 and/or 5, the API can be received from an AP 210 providing communications in a geographic area in which the UE 220 is located.

At 820, in response to determining that the API received corresponds to an AP that is a PAP, acquisition of the AP can be attempted. As such, in response to determining that the API received does not correspond to an AP that is a PAP, acquisition of the AP is not attempted. In various embodiments, determining that an API corresponds to an AP that is permitted, can include comparing the API to information indicative of identities of one or more APs 210 to which access is authorized (and/or not authorized). In some embodiments, masking the API is performed prior to comparing the API received to the information indicative of identities of one or more APs 210 to which access is authorized (and/or not authorized).

At 830, information indicative of a registration request with the AP 210 is transmitted if a determination is made that the AP from which the API is received is a PAP. In some embodiments, as discussed above with reference to FIGS. 3, 4A, 4b, 5, 6 and/or 7, the UE 220 can also attempt acquisition or not attempt acquisition based on a comparison of the API with PUZL entries for the UE 220, NLM, GNLM information, and/or any other information described herein to which the UE 220 has access and/or with which the UE 220 can be configured.

Figure 9A:
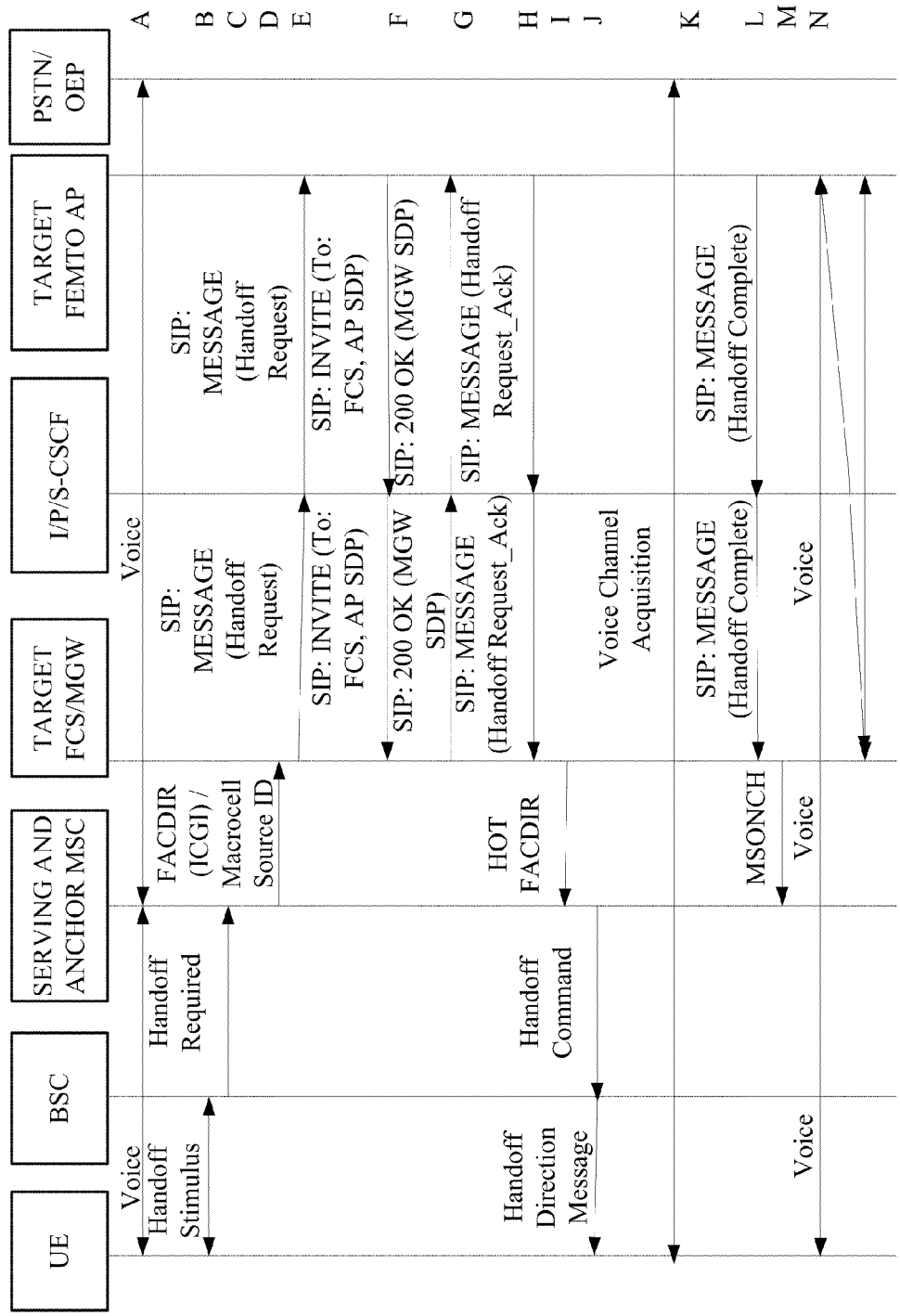
FIG. 9A illustrates an exemplary embodiment of a call flow diagram of handoff of user equipment from a macro cell to an access point according to an embodiment.
Figure 9B:
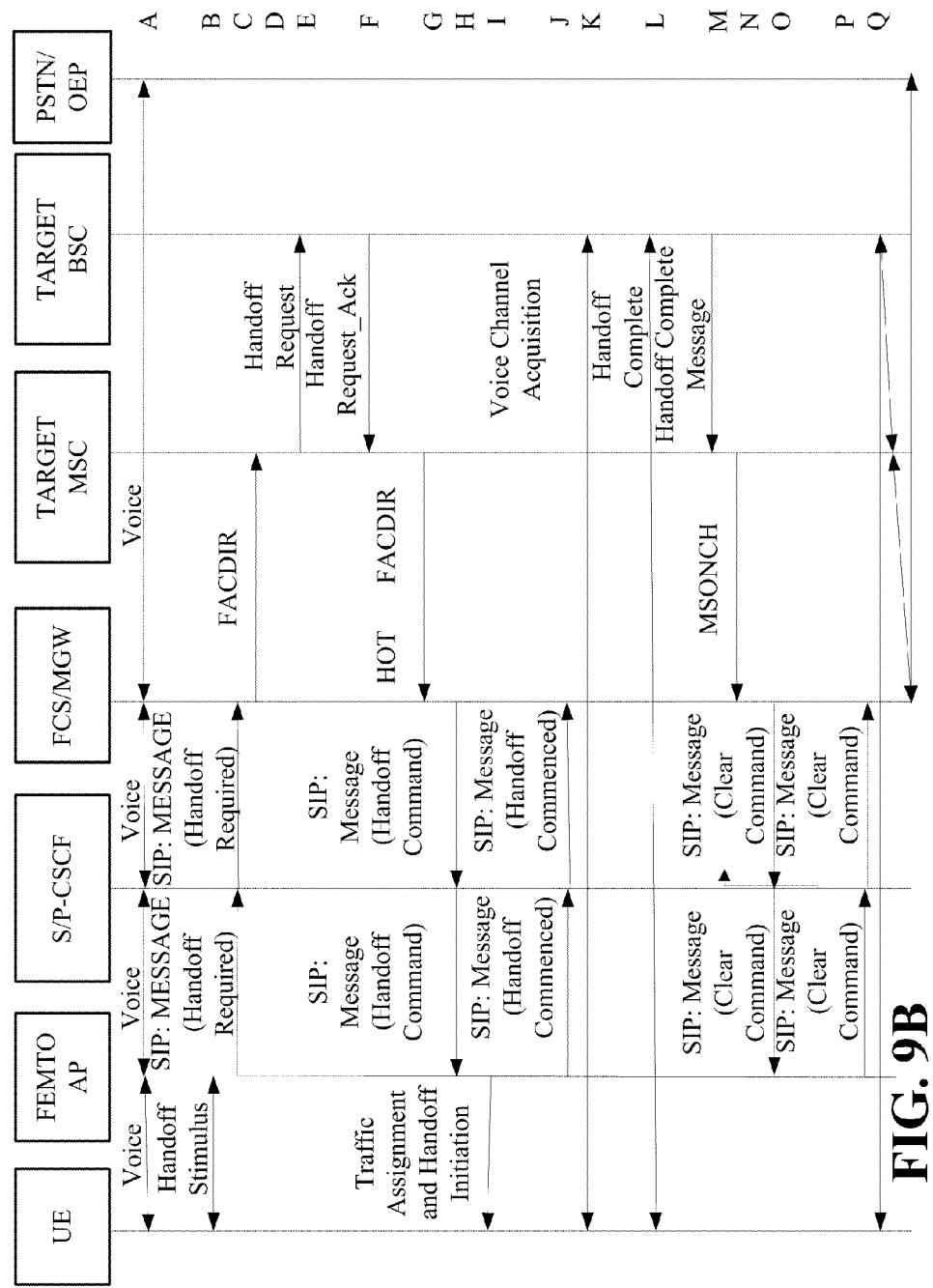
FIG. 9B illustrates an exemplary embodiment of a call flow diagram of handoff of user equipment from an access point to a macro cell according to an embodiment.

FIG. 9A illustrates an exemplary embodiment of a call flow diagram of handoff of user equipment from a macro cell to an access point according to an embodiment. FIG. 9B illustrates an exemplary embodiment of a call flow diagram of handoff of user equipment from an access point to a macro cell according to an embodiment.

To perform handoff according to the embodiments described herein, in some embodiments, the UE 220 could transmit information indicative of the MSC_ID and the Cell_ID that it receives with the API to its source sector to establish a backhaul to prepare the network and the target AP for handoff. In some embodiments, the MSC_ID and the Cell_ID can be transmitted in a modified version of a pilot signal measurement message ("PSMM"). In other embodiments, a second message, in addition to, or in lieu of the PSMM can be transmitted by the UE 220. In these embodiments, in lieu of the PSMM including the MSC_ID and the Cell_ID, the second message can include the MSC_ID and the Cell_ID. The second message can be a supplemental or companion message to the PSMM. By way of example, but not limitation, the second message can be a handoff supplementary information notification message ("HSINM").

Turning first to FIG. 9A, the operations illustrated in the call flow diagram can use signaling messages from 3GPP2 standards, although other signaling messages from other standards can also be used. Below, the call flow diagram variously references signaling messages and approaches used in the A.S0024, A.S0013, A.S0014, X.S0004-200 specifications for the 3GPP2 standard. In the embodiment described below, the AP can be a femto AP such as femto AP 210, although the process can be employed for numerous different types of APs.

At A, a call involving a UE can be in progress. In some embodiments, the UE can be the UE 220. At B, the Serving Base Station Controller ("BSC") can determine if a handoff is required. If a determination is made that a handoff is required, the Serving BSC can transmit to the Serving Mobile Switching Center ("Serving MSC"), a message indicating that handoff is required. In one embodiment, the Handoff Required message can be transmitted to the Serving MSC.

At C, the Serving MSC can determine if a handoff to a candidate Femto Convergence Server ("FCS") should be performed. The determination can be made based on an IS-41 whole Cell Global Identification ("ICGI") reported. At D, the Serving MSC can determine that the call at the UE 220 should be handed off to the candidate (now target) FCS, and that the target FCS is not already on the call path. The Serving MSC can transmit a Facilities Directive message (e.g., "FACDIR" message or "FACDIR2" message) to the target FCS, directing the target FCS to initiate a Handoff-Forward task. If the Serving MSC counts tandem segments, then the Serving MSC can increment a Segment Counter by one in the BillingID parameter.

At E, the target FCS can determine the SIP address of the femto AP 210 from the ICGI included in the FACDIR or FACDIR2 message and can look up the associated Serving-Call Session Control Function ("S-CSCF") and transmit a handoff request, or a Handoff Required message encapsulated using a SIP: MESSAGE message. The target S-CSCF can forward the SIP: MESSAGE message to the target femto AP 210 through the Proxy-Call Session Control Function ("P-CSCF").

In some embodiments, however, the ICGI can be reused by more than one femto AP, and the target femto AP 210 can be identified by the ICGI when it is unique for a given macro cell. Accordingly, in these embodiments, a source macro cell identifier can be used in combination with the ICGI to identify the target femto AP 210. The aforementioned embodiment is an alternative to the process described at E, which uses only the ICGI to identify the target femto AP 210.

Referring back to FIG. 9A, at F, the femto AP 210 can verify that the UE 220 is allowed 1× cdma2000 circuit switched services through the femto AP 210 and can transmit a SIP_INVITE message to the P-CSCF and then to the S-CSCF. The S-CSCF can forward the SIP_INVITE message to the FCS.

At G, the FCS can request the Media Gateway ("MGW") to set up an ephemeral termination and can transmit a SIP_200 OK message along with the Media Gateway Session Description Protocol ("MGW SDP") to the S-CSCF and P-CSCF. The P-CSCF can forward the SIP_200_OK message to the femto AP 210.

At H, upon receiving the SIP_200_OK message with the MGW SDP parameters, the femto AP 210 can set up the voice Real-Time Transport Protocol ("RTP") bearer path to the MGW and can transmit to the P-CSCF and S-CSCF a SIP_MESSAGE message carrying the Handoff_Request_Ack message. The S-CSCF can forward the message to the FCS.

At I, the necessary facilities on the designated target system can be made available. Therefore, the target FCS can increase the Segment Counter in the received BillingID parameter by one and use the new BillingID for the new call segment, return a FACDIR or FACDIR2 message to the requesting MSC, and initiate a Handoff-Forward task.

At J, upon receiving the FACDIR or FACDIR2 message, the Serving MSC can transmit a Mobile Handoff Order message to the served UE 220. A handoff command can be transmitted to the BSC and the BSC can transmit a handoff direction message to the UE 220.

At K, the UE can be received on the designated traffic channel of the femto AP 210. As such, voice channel acquisition is accomplished. At L, the target femto AP 210 can transmit a SIP_MESSAGE message carrying the Handoff Complete message to the P-CSCF and S-CSCF. The S-CSCF can forward the SIP_MESSAGE message carrying the Handoff Complete message to the target FCS. At M, the target FCS can complete the voice path between the traffic channel and the MSC-FCS trunk and can transmit a Mobile Station On Channel ("MSONCH") message to the initiator of the Handoff-Forward task (e.g., the Serving MSC), informing the requesting system that the target FCS has successfully completed the Handoff-Forward task. The Serving MSC, on receipt of the MSONCH, can complete the handoff process. In various embodiments, the MSC-FCS trunk should be connected at this time if it has not already been connected. At N, a call is now in progress with the UE 220 through the femto AP 210.

FIG. 9B illustrates an exemplary embodiment of a call flow diagram of handoff of user equipment from an access point to a macro cell according to an embodiment. To perform handoff according to the embodiments described herein, in some embodiments, the UE 220 could transmit information indicative of the MSC_ID and the Cell_ID that it receives with the API to its source sector to establish a backhaul to prepare the network and the target femto AP 210 for handoff. In some embodiments, the MSC_ID and the Cell_ID can be transmitted in a modified version of a pilot signal measurement message ("PSMM"). In other embodiments, a second message, in addition to, or in lieu of the PSMM can be transmitted by the UE 220. In these embodiments, in lieu of the PSMM including the MSC_ID and the Cell_ID, the second message can include the MSC_ID and/or the Cell_ID. The second message can be a supplemental or companion message to the PSMM. By way of example, but not limitation, the second message can be an HSINM.

Turning to FIG. 9B, the operations illustrated in the call flow diagram can use signaling messages from 3GPP2 standards, although other signaling messages from other standards can also be used. Below, the call flow diagram variously references signaling messages and approaches used in the A.S0024, A.S0013, A.S0014, X.S0004-200 specifications for the 3GPP2 standard. In the embodiment described below, the AP is the femto AP 210, although the process can be employed for numerous different types of APs.

At A, a call involving the served UE 220 can be in progress through the femto AP 210. For simplicity, it can be assumed that the serving FCS is the anchor FCS for the duration of the call.

At B, the femto AP 210 can determine if a handoff is required and verify an access node ("AN") identified by the UE 220. At C, the femto AP 210 can transmit a SIP_MESSAGE message including the Handoff Required message to the P-CSCF and S-CSCF. The S-CSCF can forward the SIP_MESSAGE message to the serving FCS.

At D, the Serving FCS can determine if a handoff to a candidate MSC is appropriate. This determination can be made based on the reported ICGI. The Serving MSC can determine that the call should be handed off to the candidate (now target) MSC and that the target MSC is not already on the call path. The Serving FCS can transmit an FACDIR or FACDIR2 message to the target MSC, directing the target MSC to initiate a Handoff-Forward task. If the Serving FCS counts tandem segments, then the Serving FCS can increment the Segment Counter by one in the BillingID parameter.

Referring back to FIG. 9B, at E and F, the target MSC can prepare the target BSC for Handoff. At E, a Handoff Request can be transmitted from the target MSC to the target BSC. At F, a Handoff Request_Ack message can be transmitted from the target BSC to the target MSC. At G, the facilities on the designated target system can be made available. Therefore, the target MSC can increase the Segment Counter in the received BillingID parameter by one and use the new BillingID for the new call segment, return a FACDIR or FACDIR2 message to the requesting FCS, and initiate a Handoff-Forward task.

At H, upon receiving the FACDIR or FACDIR2 message, the Serving FCS can transmit to the S-CSCF and P-CSCF a SIP_MESSAGE carrying the Handoff Command. The P-CSCF can forward the SIP_MESSAGE to the femto AP 210.

At I, the femto AP 210 can order the UE 220 to handoff to the macro cell and can transmit a SIP_MESSAGE message carrying the Handoff Commenced message to the P-CSCF and S-CSCF. At J, the S-CSCF can forward the SIP_MESSAGE message to the FCS.

At K, the UE 220 can be received on the designated traffic channel. As such, voice channel acquisition can be accomplished. At L and M, the target MSC can complete the voice path between the traffic channel and the MSC-FCS trunk and, at N, the target MSC can transmit a MSONCH to the initiator of the Handoff-Forward task (e.g., the Serving FCS), informing the requesting system that the target MSC has successfully completed the Handoff-Forward task.

At O, the Serving FCS, upon receiving the MSONCH, can complete the handoff process by transmitting a SIP_MESSAGE carrying the Clear Command message to the femto AP 210 through the S-CSCF and P-CSCF. The FCS-MSC trunk is connected at this time if it has not already been connected.

At P, the femto AP 210 can release the resources allocated to the UE 220 that performed the handoff and can transmit a SIP_MESSAGE message carrying the Clear_Complete message. At Q, the voice call is now in progress through the macro cell AN.

Figure 9C:
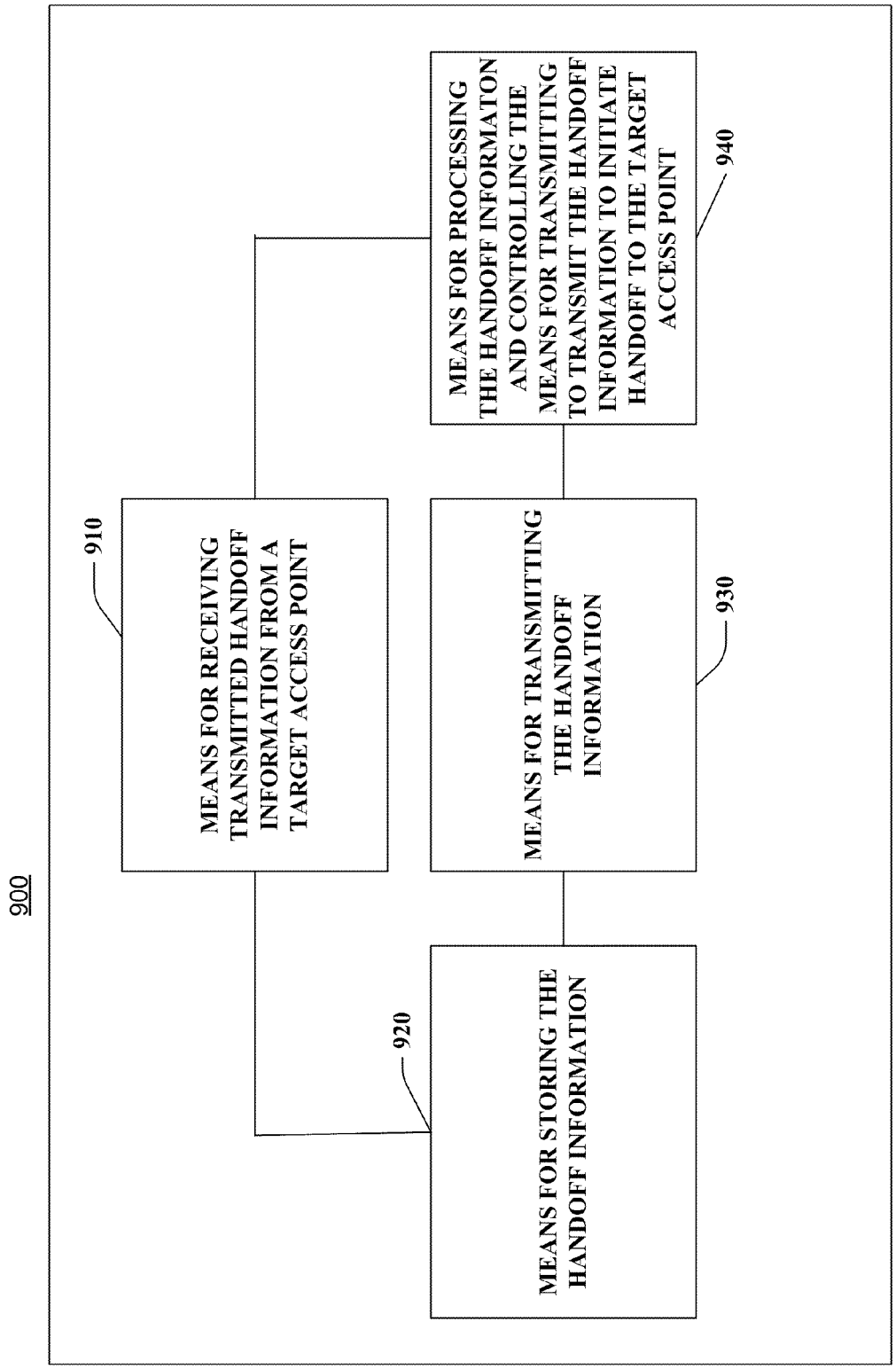
FIG. 9C illustrates an exemplary block diagram of a system for performing handoff from a macro cell to a femto access point according to an embodiment.

FIG. 9C illustrates an exemplary block diagram of a system for performing handoff from a macro cell to a femto access point according to an embodiment. As shown with reference to FIG. 9C, the system 900 can include: means for receiving 910 transmitted handoff information from a target AP. In various embodiments, the means for receiving 910 can include, but is not limited to, a receiver, a transceiver or a receiver module, such as that described with reference to FIG. 6 as the UE receiver module 620. The handoff information can include: information indicative of an identity of a mobile switching center ("MSC_ID") to which the target AP is associated; and information indicative of an identity of a cell to which the target access AP is associated. The system 900 can also include: means for storing 920 the handoff information; and means for transmitting 930 the handoff information. In various embodiments, the means for storing 920 can include, but is not limited to, a memory or memory module such as that described with reference to FIG. 6 as UE memory module 670. In various embodiments, the means for storing 920 can also include, but is not limited to, a database or database module such as that described with reference to FIG. 6 as UE database module 610.

The system 900 can also include means for processing 940 the handoff information and controlling the means for transmitting 930 to transmit the handoff information to initiate handoff to the target access point. In various embodiments, the means for processing 940 can include, but is not limited to, a processor or processor module such as that described with reference to FIG. 6 as UE processor module 630. In various embodiments, the means for transmitting 930 can include, but is not limited to, a transmitter or transmitter module such as that described with reference to FIG. 6 as UE transmitter module 640.

Figure 10A:
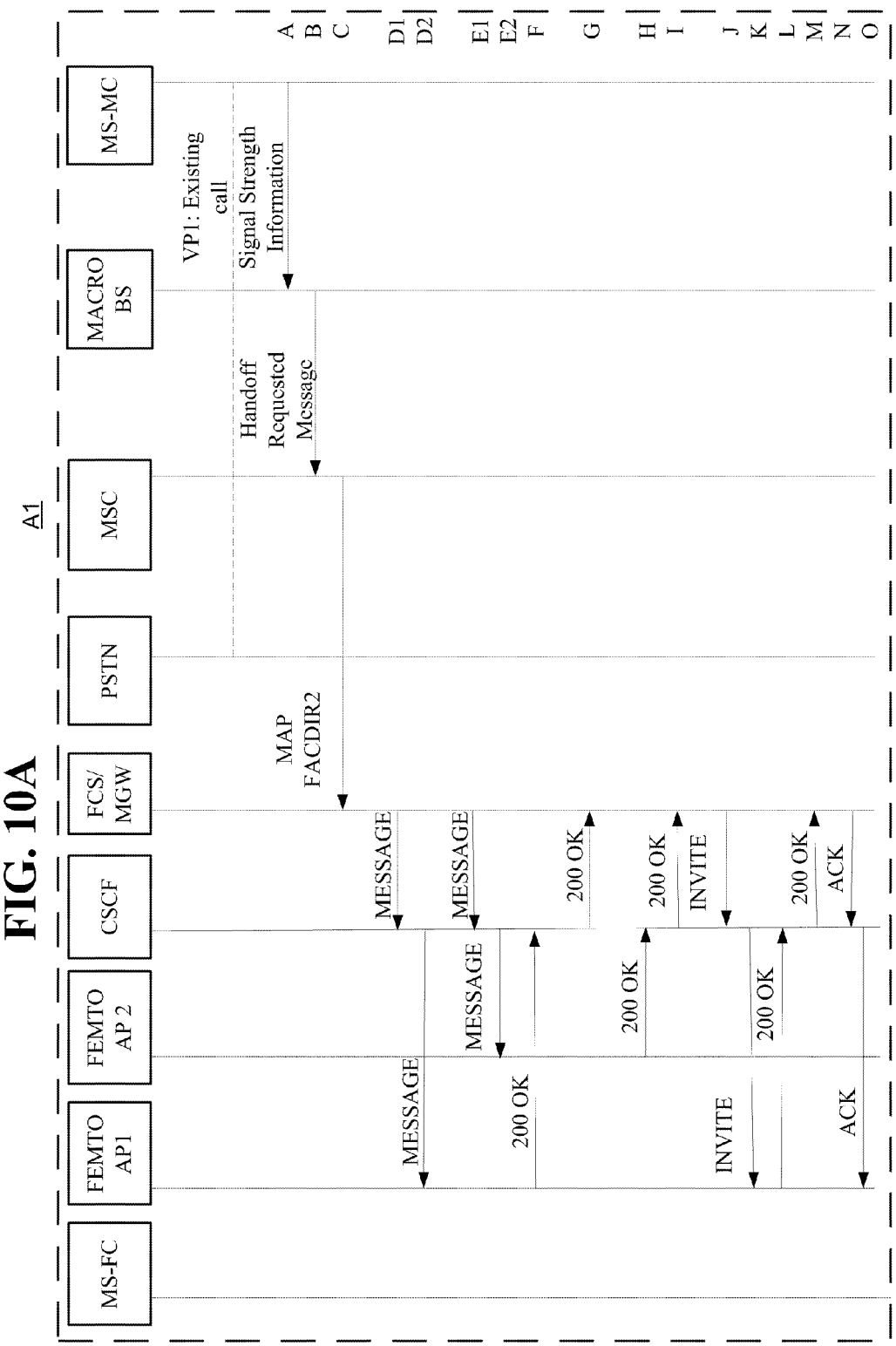
FIG. 10A illustrates a first partial view of an exemplary embodiment of a call flow diagram of handoff of a mobile station from a Macro base station controller to a femto access point according to an embodiment.
Figure 10B:
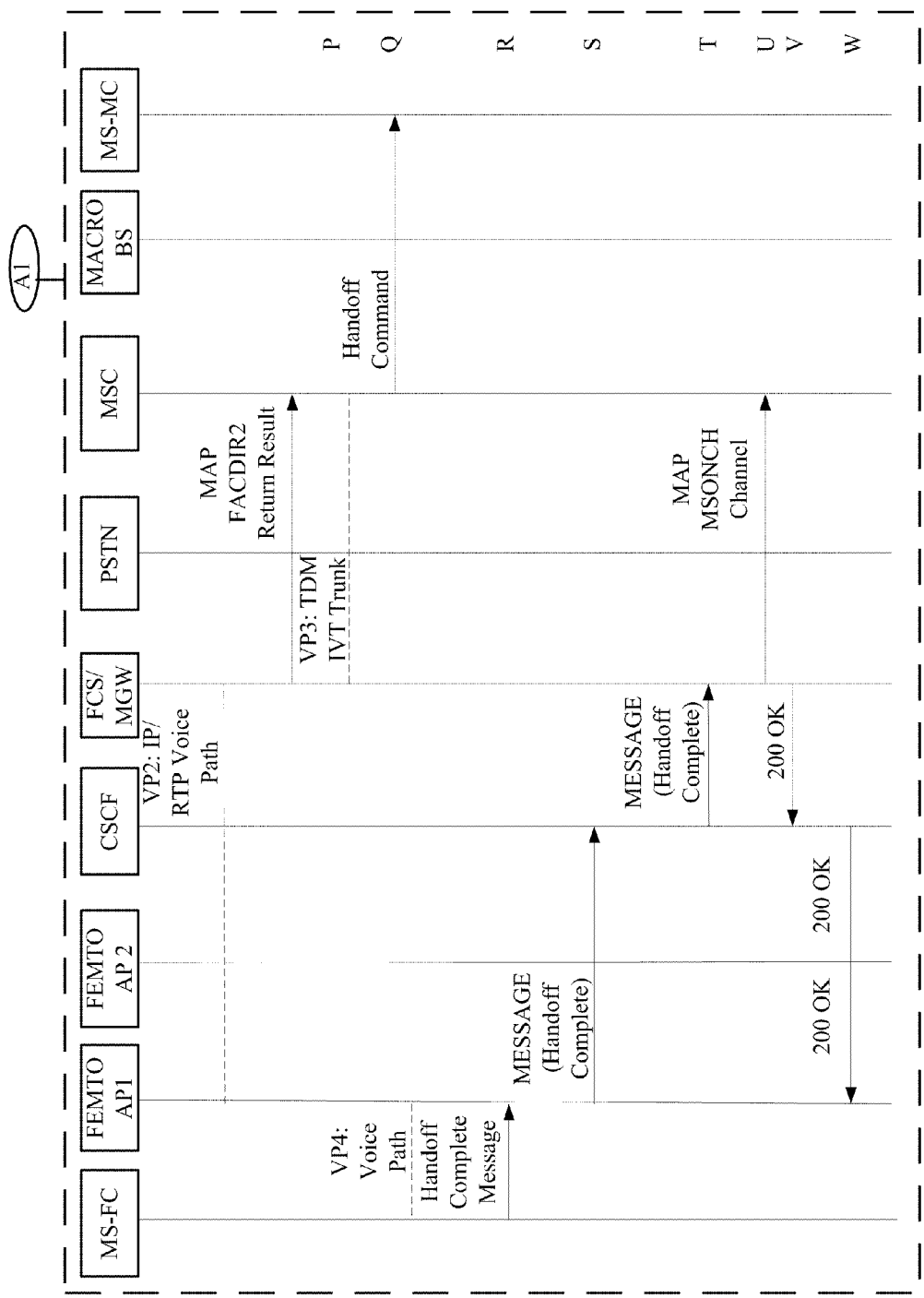
FIG. 10B illustrates a second partial view of an exemplary embodiment of a call flow diagram of handoff of a mobile station from a Macro base station controller to a femto access point according to an embodiment.

FIGS. 10A and 10B illustrate first and second partial views of an exemplary embodiment of a call flow diagram of handoff of a mobile station from a macro base station controller to a femto access point according to an embodiment. FIG. 10A shows the call flow operations from A to O while FIG. 10B shows the call flow operations from P to W. The complete embodiment of FIGS. 10A and 10B can be provided by following step O with step P.

In various embodiments, the call flow illustrates exemplary steps that can be performed for mobile station ("MS") handoff between the femto access point ("femto AP 210") and the macro base station controller ("Macro BSC") when the MS is in the geographic vicinity of a femto AP 210. In embodiments, the MS can be the UE 220, a system, device, subscriber unit, subscriber station, mobile, mobile device, remote station, remote terminal, access terminal, user terminal, communication device, user agent and/or a user device.

To perform handoff according to the embodiments described herein, in some embodiments, the MS could transmit information indicative of signal strength measurements to establish a backhaul to prepare the network and the target femto AP 210 for handoff. The signal strength measurements could be included in a Pilot Strength Measurement ("PSM") report. In some embodiments, the MS could transmit a second message, in addition to, or in lieu of the PSM report. In these embodiments, the second message can be a supplemental or companion message to the PSM report. By way of example, but not limitation, the second message can be an HSINM.

The process illustrated in FIGS. 10A and 10B can be used for 1× voice call handoff from a macro cell to a target femto AP 210. Turning now to FIG. 10A, the operations illustrated in the call flow diagram can use signaling messages from 3GPP2 standards, although other signaling messages from other standards can also be used. Below, the call flow diagram variously references signaling messages and approaches used in the X.P0059-200-0 v0.7 and C.S0005 specification for the 3GPP2 standard.

In the embodiment shown in FIGS. 10A and 10B, in some cases, the following preconditions exist for successful handoff. There is an existing voice path between the MS on the 1× macro network ("MS-MC") and a Public Switched Telephone Network ("PSTN") address through the 1× macro network base station ("Macro BS") and (serving and/or anchoring) MSC.

At A, the MS can monitor the pilot signal strength for neighboring cells, including femto cells. In various embodiments, the MS can be a MS-MC and the macro cell can be represented by an entity such as a Macro BS. The MS can monitor the neighbor cell pilot strength. The MS can transmit signal strength information to the macro cell. In some embodiments, the signal strength information can be the pilot signal strength measurements ("PSMM"). In some embodiments, as described above with reference to FIG. 9A, the HSINM can be transmitted in lieu of or in addition to the PSMM.

At B, the macro BS can determine that handoff to a femto AP 210 is necessary, and can signal a Handoff Required message (and/or Handoff Requested message) to the MSC.

At C, the MSC can determine that the target cell is associated with the information indicative of an identity of the mobile switching center ("MSC_ID") for the FCS and can transmit a Mobile Application Part (MAP) FacilityDirective2 (FACDIR2) message to the target FCS associated with the target cell. In some embodiments, the MAP FACDIR2 message can include a Time Division Multiplexing Circuit Identifier ("TDM Circuit ID"), a serving cell identifier and a target cell identifier.

The FCS can reserve the inter-vendor trunk (IVT) port that terminates the IVT identified in the FACDIR2 message. The FCS can also reserve the MGW resources required to terminate the RTP bearer path with the target femto AP 210 (note that the IVT and the MGW could be handled by a separate Media Gateway Control Function ("MGCF")).

At D, if a target femto AP 210 cannot be uniquely determined, the FCS can transmit a SIP MESSAGE with a measurement request for the MS. The message can be transmitted to the candidate femto AP that match the target cell information. In the embodiment shown in FIG. 10B, two femto APs (i.e., Femto AP1 and Femto AP2) are shown as possible candidates; however, it is possible to have more than two femto AP candidates. As such, at E, the FCS transmits a second SIP MESSAGE with a measurement report to a second candidate femto AP. The SIP MESSAGE can include a request that the candidate femto detect and measure MS signal strengths for the incoming handoff. As shown, in one embodiment, the SIP MESSAGE can be transmitted to the CSCF first (steps D1, E1) and from the CSCF to Femto AP1 and Femto AP2 (steps D2, E2, respectively). In some embodiments, the SIP MESSAGE can be a MESSAGE (Femto AP1, Measurement Request) message at D1 and D2. In some embodiments, the SIP MESSAGE can be a MESSAGE (Femto APs, Measurement Request) message at E1 and E2.

At F, G, H and I, the candidate femto AP can try to detect the MS and measure the signal strength of the MS uplink while the MS is engaged in an active voice call over the macro network. The candidate femto APs can respond to the FCS with radio uplink signal strength measurements for the MS in the SIP 200 OK responses to the FCS. As shown, the Femto AP1 and Femto AP2 can transmit the measurements to the CSCF first (steps F and H, respectively) and then from the CSCF to the FCS (steps G and I, respectively). In some embodiments, at F, G, H and/or I, the measurements can be transmitted as 200 OK; MESSAGE (RL signal strength) messages.

The FCS can uniquely identify the selected target femto based on the signal strength measurements of the MS reported by the candidate femto APs. In some embodiments, the Femto AP 1 is the selected target femto AP.

The FCS can then transmit to the target femto AP a SIP INVITE with the MGW SDP offer and include the Content Type Handoff Request. The SIP INVITE can also include an identifier of the target femto AP. The SIP INVITE can first be transmitted to the CSCF (step J) and then from the CSCF to the target femto AP (step K). In some embodiments, the SIP INVITE can be an INVITE (target femto AP, Handoff Request, MGW SDP) message at J and K.

The femto AP can respond by transmitting an immediate 200 OK message containing the femto AP SDP answer and include the content Type Handoff Request Ack to the FCS. First, the 200 OK message can be transmitted to the CSCF (step L) and then from the CSCF to the FCS (step M). At L and at M, the 200 OK message can be a 200 OK (femto AP SDP Answer, Handoff Request ACK) message.

At N, the FCS can transmit back to the femto AP an acknowledgement message acknowledging receipt of the 200 OK message. The acknowledgement can be transmitted first to the CSCF (step N) and then from the CSCF to the femto AP (step O).

At this time the voice/bearer path through the IP Multimedia Subsystem ("IMS") core network is established. In some embodiments, the path is an IP/RTP voice path.

Turning next to FIG. 10B, the process can continue. At P, the FCS can respond to the MSC by transmitting to the MSC a MAP FACDIR2 return result. In some embodiments, the MSC to which the FCS transmits the MAP FACDIR2 return result can be an anchor MSC. The MAP FACDIR2 returned result can confirm the establishment of the IVT connection. At Q, the MSC can direct the MS via the macro BS to handoff to the target femto AP by transmitting to the MS a Handoff Command.

At R, a Handoff complete message can be transmitted from the MS on the femto cell network ("MS-FC") to the femto AP, the MS can acquire the forward link traffic channel from the femto AP, and a voice path between the MS and femto AP can be established.

The femto AP can notify the FCS that the handoff is complete via a SIP MESSAGE transmitted from the femto AP to the FCS. First, the SIP MESSAGE is transmitted to the CSCF (step S) and then from the CSCF to the FCS (step T).

At U, the FCS can signal the MSC that the MS has completed the handoff successfully by transmitting to the MSC a MAP MSONCH Channel message. In some embodiments, the MSC to which the FCS transmits the MAP MSONCH Channel message can be an anchor MSC.

The FCS can respond to the femto AP with a 200 OK acknowledgment of receipt of the SIP MESSAGE described above with reference to T. The 200 OK acknowledgment is first transmitted to the CSCF (step V) and then from the CSCF to the femto AP (step W).

Figure 10C:
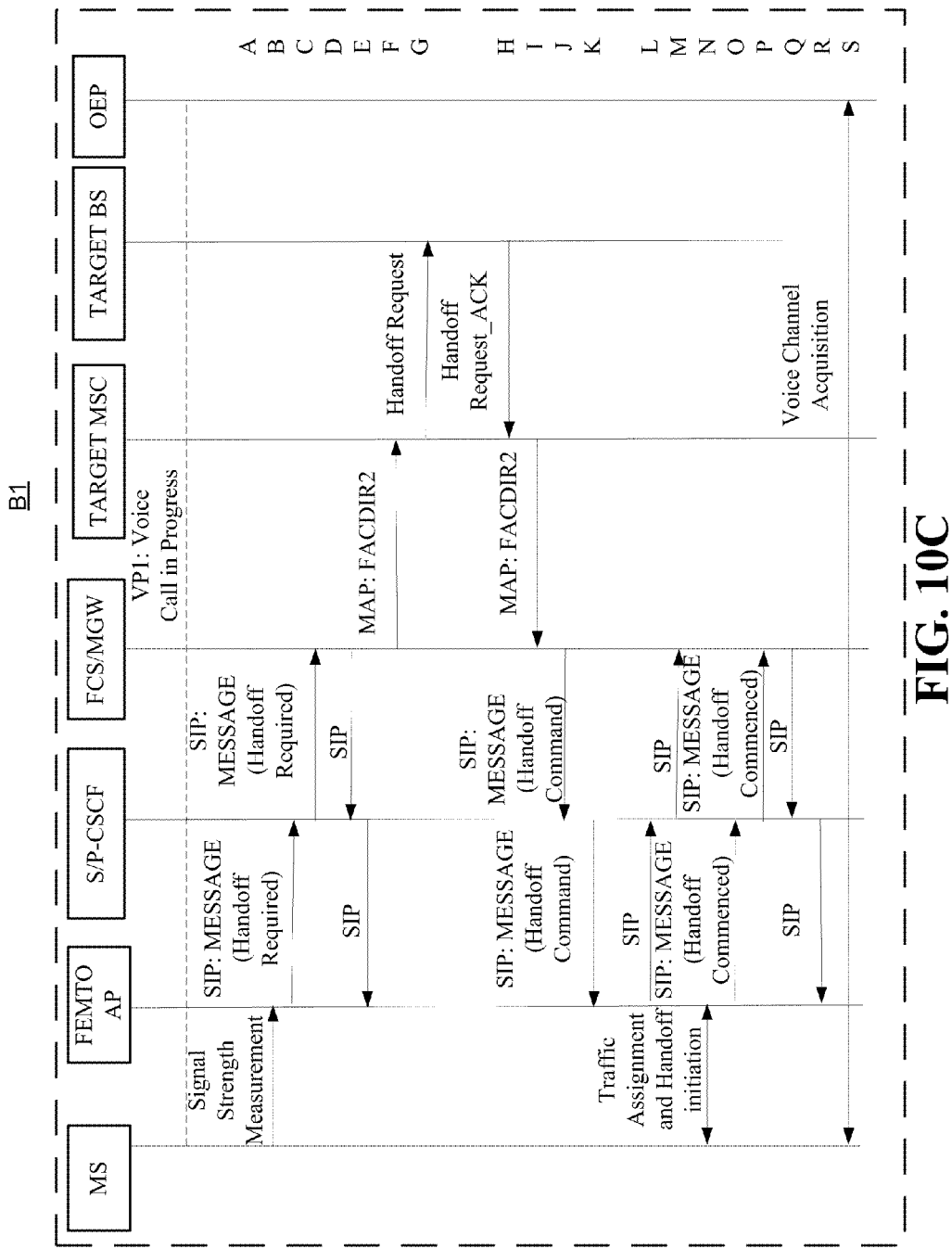
FIG. 10C illustrates a first partial view of an exemplary embodiment of a call flow diagram of handoff of a mobile station from a femto access point to a macro base station controller according to an embodiment.
Figure 10D:
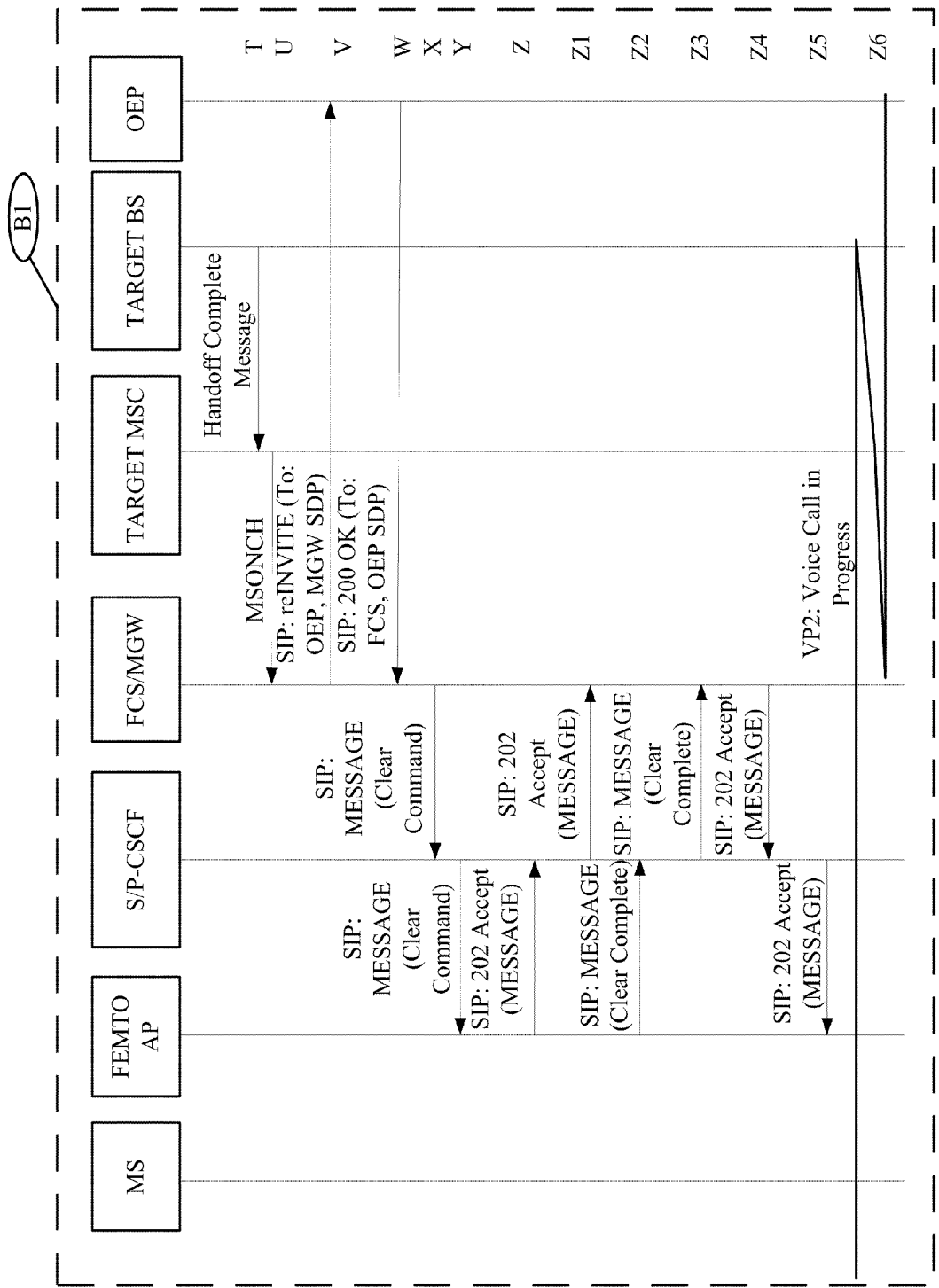
FIG. 10D illustrates a second partial view of an exemplary embodiment of a call flow diagram of handoff of a mobile station from a femto access point to a macro base station controller according to an embodiment.

FIGS. 10C and 10D illustrate first and second partial views of an exemplary embodiment of a call flow diagram of handoff of a mobile station from a femto access point to a macro base station controller according to an embodiment. FIG. 10C shows the call flow operations from A to S while FIG. 10D shows the call flow operations from T to Z6. The complete embodiment of FIGS. 10C and 10D can be provided by following step S with step T.

Turning now to FIGS. 10C and 10D, the operations illustrated in the call flow diagram can use signaling messages from 3GPP2 standards, although other signaling messages from other standards can also be used. Below, the call flow diagram variously references signaling messages and approaches used in the X.P0059-200-0 v0.7, X.S0004-200, A.S0013 and A.S0024 specification for the 3GPP2 standard.

The process illustrated in FIGS. 10C and 10D, can be used for 1× voice call handoff from a femto AP to a target macro cell.

At A, the femto can receive the signal strength measurement. In various embodiments, the signal strength measurement can be a Pilot Strength Measurement ("PSM") report and/or an HSINM report from the MS. As noted above, in some embodiments, the MS could transmit a second message, in addition to, or in lieu of the PSM report. In these embodiments, the second message can be a supplemental or companion message to the PSM report. By way of example, but not limitation, the second message can be an HSINM. The femto AP can use the PSM report to determine if a handoff is required and verifies the target cell identified by the MS is appropriate.

As noted above, in some embodiments, the MS could transmit a second message, in addition to, or in lieu of the PSM report. In these embodiments, the second message can be a supplemental or companion message to the PSM report. By way of example, but not limitation, the second message can be an HSINM.

Referring back to FIG. 10C, at B, the femto AP can transmit a SIP_MESSAGE with Content Type Handoff Required Message to the P-CSCF and/or S-CSCF. At C, the S-CSCF can forward the SIP_MESSAGE to the serving FCS.

At D and E, a SIP message can be transmitted. In particular at D, the FCS can transmit a SIP__202_Accept message to the S-CSCF acknowledging receipt of the SIP_MESSAGE from the transmission of the SIP_MESSAGE described above at C. At E, the S-CSCF can forward this SIP__202_Accept message to the femto AP.

The serving FCS can determine if a handoff to a candidate MSC (based on the reported ICGI) is appropriate.

The Serving FCS can determine whether the call should be handed off to the candidate (now target) MSC and that the target MSC is not already on the call path. In F, the Serving FCS can transmit a FACDIR2 to the target MSC, directing the target MSC to initiate a Handoff-Forward task. If the Serving FCS counts tandem segments, then the Serving FCS can increment the Segment Counter by one in the BillingID parameter.

At G and H, the target MSC can prepares the target AN for Handoff. In particular, at G, the target MSC can transmit a Handoff Request message to the target BS and, at H, the target BS can transmit back to the target MSC a Handoff Request_ACK message.

At I, the necessary facilities on the designated target system are generally available. As such, the target MSC can increase the Segment Counter in the received BillingID parameter by one and use the new BillingID for the new call segment, return a FACDIR2 message to the requesting FCS, and initiate a Handoff-Forward task.

At J, upon receipt of the FACDIR2, the Serving FCS can transmit to the S-CSCF and/or P-CSCF, a SIP_MESSAGE with the Content Type Handoff Command. At K, the P-CSCF can forward the SIP_MESSAGE to the femto AP.

At L and M, a SIP message can be transmitted. In particular, at L, the femto AP can transmit to the S-CSCF and/or the P-CSCF a SIP: 202 Accept message acknowledging the receipt of the SIP_MESSAGE transmitted as discussed above at K. At M, the S-CSCF can forward the SIP: 202 Accept message to the FCS.

At N, the femto AP can order the MS to handoff to the Macro BS. In some embodiments, traffic assignment and handoff initiation then commences between the MS and the femto AP.

At O, the femto AP can transmit a SIP_MESSAGE with Content Type Handoff Commenced to the P-CSCF and/or S-CSCF. At P, the S-CSCF can forward the SIP_MESSAGE to the FCS.

At Q and R, a SIP message can be transmitted. In particular, at Q, the FCS can transmit to the S-CSCF a SIP: 202 Accept message acknowledging the receipt of SIP_MESSAGE as described above with reference to P. At R, the S-CSCF can forward the SIP: 202 Accept message to the femto AP through the P-CSCF.

At S, the MS can receive communications on the designated traffic channel. In some embodiments, the communications are voice communications, although other types of communications may also be received.

At T, the target BS can transmit to the target MSC, a Handoff Complete Message. At U, the target MSC can complete the voice path between the traffic channel and the MSC-FCS trunk and can transmit a MSONCH message to the initiator of the Handoff-Forward task, the Serving FCS, informing the requesting system that the target MSC has successfully completed the Handoff-Forward task.

At V and/or at any step after the step described with reference to L above, the Serving FCS can transmit a SIP_reINVITE to the Other End Point ("OEP") with the SDP of the MGW the Serving FCS controls to setup the bearer path between the OEP and the MGW instead of the femto AP.

At W, the OEP can transmit a SIP__200_OK to the FCS after re-pointing the bearer path from the OEP to the MGW controlled by the FCS instead of the femto AP. At X, upon receipt of the MSONCH message as described above with reference to U, and a SIP__200_OK as described above with reference to W, the FCS can complete the handoff process by transmitting a SIP_MESSAGE with the Content Type Clear_Command to the femto AP, and at Y, to the S-CSCF and P-CSCF. In some embodiments, the FCS-MSC trunk should be connected at this time if it has not already been connected.

At Z, the femto AP can transmit to the S-CSCF and/or P-CSCF a SIP: 202 Accept message acknowledging the receipt of SIP_MESSAGE described above with reference to V. At Z1, the S-CSCF can forward the SIP: 202 Accept message to the FCS.

At Z2, the femto AP can release the resources allocated to the MS that performed the handoff and can transmit a SIP_MESSAGE with the Content Type Clear Complete to the P-CSCF and/or S-CSCF. At Z3, the S-CSCF can forward the SIP_MESSAGE to the FCS.

At Z4, the FCS can transmit to the S-CSCF a SIP: 202 Accept message acknowledging the receipt of SIP_MESSAGE in step 24. At Z5, the S-CSCF can forward the SIP: 202 Accept message to the femto AP through the P-CSCF. At Z6, the voice call can then be in progress through the target Macro BS.

Figure 11:
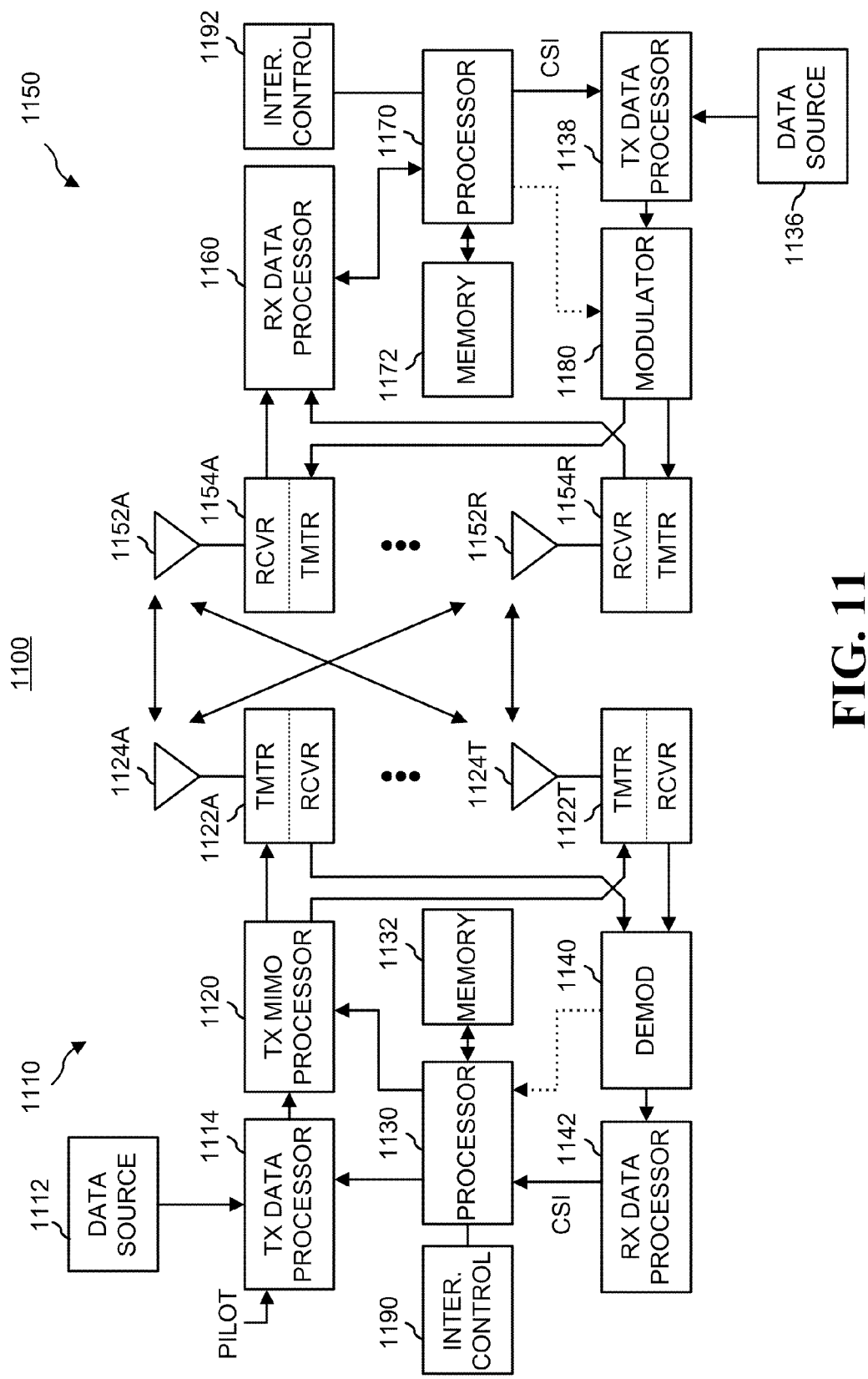
FIG. 11 illustrates exemplary components that may be employed to facilitate communication between nodes.

FIG. 11 illustrates an exemplary communication system that provides AP identification. Referring now to FIG. 11, a block diagram illustrating an example wireless communication system 1100 in which various aspects described herein can function is provided. In one example, system 1100 is a multiple-input multiple-output (MIMO) system that includes a transmitter system 1100 and a receiver system 1150. It should be appreciated, however, that transmitter system 1100 and/or receiver system 1150 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1100 and/or receiver system 1150 described herein could be utilized in connection with a single output to single input antenna system.

In accordance with one aspect, traffic data for a number of data streams are provided at transmitter system 1100 from a data source 1102 to a transmit (TX) data processor 1104. In one example, each data stream can then be transmitted via a respective transmit antenna 1124. Additionally, TX data processor 1104 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1150 to estimate channel response. Back at transmitter system 1100, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1130.

Next, modulation symbols for all data streams can be provided to a TX processor 1120, which can further process the modulation symbols (e.g., for OFDM). TX MIMO processor 1120 can then provides $N_T$ modulation symbol streams to $N_T$ transceivers 1122a through 1122t. In one example, each transceiver 1122 can receive and process a respective symbol stream to provide one or more analog signals. Each transceiver 1122 can then further condition (e.g., amplify, filter, and upconvert) the analog signals to provide a modulated signal suitable for transmission over a MIMO channel. Accordingly, $N_T$ modulated signals from transceivers 1122a through 1122t can then be transmitted from $N_T$ antennas 1124a through 1124t, respectively.

In accordance with another aspect, the transmitted modulated signals can be received at receiver system 1150 by $N_R$ antennas 1152a through 1152r. The received signal from each antenna 1152 can then be provided to respective transceivers 1154. In one example, each transceiver 1154 can condition (e.g., filter, amplify, and downconvert) a respective received signal, digitize the conditioned signal to provide samples, and then processes the samples to provide a corresponding "received" symbol stream. An RX MIMO/data processor 1160 can then receive and process the $N_R$ received symbol streams from $N_R$ transceivers 1154 based on a particular receiver processing technique to provide $N_T$ "detected" symbol streams. In one example, each detected symbol stream can include symbols that are estimates of the modulation symbols transmitted for the corresponding data stream. RX processor 1160 can then process each symbol stream at least in part by demodulating, deinterleaving, and decoding each detected symbol stream to recover traffic data for a corresponding data stream. Thus, the processing by RX processor 1160 can be complementary to that performed by TX MIMO processor 1120 and TX data processor 1115 at transmitter system 1100. RX processor 1160 can additionally provide processed symbol streams to a data sink 1164.

In accordance with one aspect, the channel response estimate generated by RX processor 1160 can be used to perform space/time processing at the receiver, adjust power levels, change modulation rates or schemes, and/or other appropriate actions. Additionally, RX processor 1160 can further estimate channel characteristics such as, for example, signal-to-noise-and-interference ratios (SNRs) of the detected symbol streams. RX processor 1160 can then provide estimated channel characteristics to a processor 1170. In one example, RX processor 1160 and/or processor 1170 can further derive an estimate of the "operating" SNR for the system. Processor 1170 can then provide channel state information (CSI), which can comprise information regarding the communication link and/or the received data stream. This information can include, for example, the operating SNR. The CSI can then be processed by a TX data processor 1118, modulated by a modulator 1180, conditioned by transceivers 1154a through 1154r, and transmitted back to transmitter system 1100. In addition, a data source 1115 at receiver system 1150 can provide additional data to be processed by TX data processor 1118.

Back at transmitter system 1100, the modulated signals from receiver system 1150 can then be received by antennas 1124, conditioned by transceivers 1122, demodulated by a demodulator 1140, and processed by a RX data processor 1142 to recover the CSI reported by receiver system 1150. In one example, the reported CSI can then be provided to processor 1130 and used to determine data rates as well as coding and modulation schemes to be used for one or more data streams. The determined coding and modulation schemes can then be provided to transceivers 1122 for quantization and/or use in later transmissions to receiver system 1150. Additionally and/or alternatively, the reported CSI can be used by processor 1130 to generate various controls for TX data processor 1104 and TX MIMO processor 1120. In another example, CSI and/or other information processed by RX data processor 1142 can be provided to a data sink 1144.

In one example, processor 1130 at transmitter system 1100 and processor 1170 at receiver system 1150 direct operation at their respective systems. Additionally, database 1132 at transmitter system 1100 and database 1172 at receiver system 1150 can provide storage for program codes and data used by processors 1130 and 1170, respectively. Further, at receiver system 1150, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

The teachings herein may be incorporated into a node (e.g., a device) employing various components for communicating with at least one other node. FIG. 11 depicts several sample components that may be employed to facilitate communication between nodes. Specifically, FIG. 11 illustrates a wireless device 1110 (e.g., an access point) and a wireless device 1150 (e.g., a UE) of a MIMO system 1100. At the device 1110, traffic data for a number of data streams is provided from a data source 1112 to a transmit ("TX") data processor 1114.

In some aspects, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers ("XCVR") 1122A through 1122T. In some aspects, the TX MIMO processor 1120 applies beamforming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver ("XCVR") 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive ("RX") data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator ("DEMOD") 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform interference control operations as taught herein. For example, an interference ("INTER.") control component 1190 may cooperate with the processor 1130 and/or other components of the device 1110 to send/receive signals to/from another device (e.g., device 1150) as taught herein. Similarly, an interference control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the interference control component 1190 and the processor 1130 and a single processing component may provide the functionality of the interference control component 1192 and the processor 1170.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM database, flash database, ROM database, EPROM database, EEPROM database, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

In one or more exemplary embodiments, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for facilitating identification and acquisition of an access point, the method comprising:
   receiving access point information indicative of an identification of the access point;
   masking a portion of the access point information;
   comparing an unmasked portion of the access point information with information indicative of identities of one or more access points to which access is permitted; and
   in response to determining that the access point is a permitted access point based on the comparison, attempting acquisition of the access point.

2. The method of claim 1, wherein determining that the access point is a permitted access point based on the comparison comprises:
   in response to determining that the unmasked portion of the access point information corresponds to at least one of the identities of the one or more access points to which access is permitted, determining that the access point is a permitted access point.

3. The method of claim 2, wherein the information indicative of the identities of one or more access points to which access is permitted is included in a white list.

4. The method of claim 2, wherein the information indicative of the identities of one or more access points to which access is not permitted is included in a black list.

5. The method of claim 1, wherein the access point information is 128 bits long.

6. The method of claim 1, wherein the access point information is 48 bits long.

7. The method of claim 1, wherein the access point information comprises a computer-readable address indicative of the identification of the access point.

8. The method of claim 7, wherein the computer-readable address is an Internet Protocol version 6 address for the access point.

9. The method of claim 7, wherein the access point information further comprises human-readable information indicative of the identification of the access point.

10. The method of claim 9, wherein the human-readable information is a text string.

11. The method of claim 9, wherein the access point information is included in a message that also includes information indicative of an identity of a mobile switching center and information indicative of an identity of a cell to which the access point is associated.

12. The method of claim 11, further comprising transmitting the information indicative of an identity of a mobile switching center and information indicative of an identity of a cell to which the access point is associated during handoff.

13. The method of claim 1, wherein the access point information is received after a first predetermined time interval or after a second predetermined time interval, the first predetermined time interval and the second predetermined time interval being based on a length of the access point information.

14. The method of claim 13, wherein, when the access point information is a first length and includes a computer-readable address and human-readable information, the access point information is received at the first predetermined time interval and wherein, when the access point information is a second length and includes a computer-readable address, the first length being longer than the second length, the access point information is received at a second predetermined time interval, the second predetermined time interval being less than the first predetermined time interval.

15. The method of claim 14, wherein the second predetermined time interval occurs at approximately every 1.28 seconds.

16. The method of claim 14, wherein the second predetermined time interval occurs at approximately every 2.0 seconds.

17. The method of claim 14, wherein the first predetermined time interval occurs at approximately every 10 seconds.

18. The method of claim 1, wherein the access point information is received on a paging channel.

19. The method of claim 1, wherein the access point is a femto cell.

20. The method of claim 1, wherein the access point is one of a pico cell or a personal cell.

21. A computer program product, comprising:
a computer-readable medium comprising:
code for causing at least one computer to receive access point information indicative of an identification of an access point;
code for causing at least one computer to mask a portion of the access point in formation;
code for causing at least one computer to compare an unmasked portion of the access point information with information indicative of identities of one or more access points to which access is permitted; and
code for causing at least one computer to attempt acquisition of the access point in response to determining, based on the comparison, that the access point is a permitted access point.

22. An apparatus comprising:
means for receiving access point information indicative of an identification of an access point;
means for masking a portion of the access point information;
means for comparing an unmasked portion of the access point information with information indicative of identities of one or more access points to which access by the apparatus is authorized; and
means for attempting to acquire the access point if the means for comparing generates an output indicative of the apparatus being permitted to access the access point.

23. An apparatus comprising:
a user equipment ("UE") database module configured to store information indicative of identities of one or more access points to which access by the apparatus is authorized;
a UE receiver module configured to receive a first signal including access point information indicative of an identification of an access point proximate to a geographical location of the apparatus;
a UE filter module coupled to the UE receiver module and configured to mask a portion of the received access point information;
a UE processor module coupled to the UE filter module and the UE database module and configured to compare an unmasked portion of the access point information with the information indicative of identities of one or more access points to which access by the apparatus is authorized, and determine whether the access point is a permitted access point based on a result of the comparison; and
a UE transmitter module coupled to the UE processor module and configured to transmit a signal to the access point for attempting acquisition of the access point if the UE processor module determines that the access point is a permitted access point.

24. The apparatus of claim 23, wherein the information indicative of the identities of the one or more access points to which access by the apparatus is authorized is a white list.

25. The apparatus of claim 23, wherein the UE database module is further configured to store information indicative of identities of one or more access points to which access by the apparatus is not authorized.

26. The apparatus of claim 25, wherein the information indicative of the identities of the one or more access points to which access by the apparatus is not authorized is a black list.

27. The apparatus of claim 23, further comprising:
a UE display module coupled to the UE processor module and configured to display human-readable information included in the received access point information.

28. The apparatus of claim 27, wherein the UE display module is further configured to display the information indicative of the identities of the one or more access points to which access by the apparatus is authorized.

29. A method for facilitating identification and acquisition of a femto cell access point, the method comprising:
transmitting, to user equipment, access point information indicative of an identification of the femto cell access point, wherein the access point information is transmitted after a first predetermined time interval or after a second predetermined time interval, the first predetermined time interval and the second predetermined time interval being based on a length of the access point information.

* * * * *